United States Patent
Lee et al.

(10) Patent No.: US 9,739,420 B2
(45) Date of Patent: *Aug. 22, 2017

(54) LIQUEFIED GAS TREATMENT SYSTEM FOR VESSEL

(71) Applicant: DAEWOO SHIPBUILDING & MARINE ENGINEERING CO., LTD., Seoul (KR)

(72) Inventors: Joon Chae Lee, Daegu (KR); Soon Been Kwon, Seoul (KR); Nam Soo Kim, Suwon-si (KR); Dong Kyu Choi, Seongnam-si (KR); Jeheon Jung, Seoul (KR); Young Sik Moon, Gwangmyeong-si (KR); Dong Chan Kim, Busan (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/437,479

(22) PCT Filed: Oct. 24, 2013

(86) PCT No.: PCT/KR2013/009543
§ 371 (c)(1),
(2) Date: Apr. 21, 2015

(87) PCT Pub. No.: WO2014/065621
PCT Pub. Date: May 1, 2014

(65) Prior Publication Data
US 2015/0300301 A1   Oct. 22, 2015

(30) Foreign Application Priority Data

Oct. 24, 2012 (KR) .................. 10-2012-0118241
Dec. 11, 2012 (KR) .................. 10-2012-0143522
Jun. 26, 2013 (KR) .................. 10-2013-0073731

(51) Int. Cl.
*F17C 7/04*     (2006.01)
*B63B 25/16*    (2006.01)
(Continued)

(52) U.S. Cl.
CPC .............. *F17C 7/04* (2013.01); *B63B 25/08* (2013.01); *B63B 25/14* (2013.01); *B63B 25/16* (2013.01);
(Continued)

(58) Field of Classification Search
CPC .......... Y02T 50/672; Y02T 50/44; F02C 9/40; F02C 3/22; F02C 7/224; B64D 37/30; F17C 7/04
See application file for complete search history.

(56) References Cited

U.S. PATENT DOCUMENTS 3,857,245 A    12/1974 Jones
3,885,394 A     5/1975 Witt et al.
(Continued)

FOREIGN PATENT DOCUMENTS

CN    102084114 A    6/2011
CN    103080525 A    5/2013
(Continued)

OTHER PUBLICATIONS

Singapore Office Action dated Feb. 17, 2016 of corresponding Singapore Patent Office Action No. 11201503110T—19 pages.
(Continued)

*Primary Examiner* — Sizo Vilakazi
(74) *Attorney, Agent, or Firm* — Knobbe Martens Olson & Bear LLP

(57) ABSTRACT

Provided is a liquefied gas treatment system for a vessel, which includes a cargo tank storing liquefied natural gas (LNG), and an engine using the LNG as fuel. The liquefied gas treatment system includes: a compressor line configured to compress boil-off gas (BOG) generated in the cargo tank by a compressor and supply the compressed BOG to the engine as fuel; a high pressure pump line configured to compress the LNG stored in the cargo tank by a pump and
(Continued)

supply the compressed LNG to the engine as fuel; and a heat exchanger configured to liquefy a part of BOG, which is compressed by the compressor, by exchanging heat with BOG that is discharged from the cargo tank and transferred to the compressor.

16 Claims, 13 Drawing Sheets

(51) Int. Cl.
| | |
|---|---|
| B63H 21/38 | (2006.01) |
| F02M 21/02 | (2006.01) |
| F17C 9/02 | (2006.01) |
| F17C 13/08 | (2006.01) |
| F25J 1/00 | (2006.01) |
| F25J 1/02 | (2006.01) |
| B63B 25/08 | (2006.01) |
| F17C 7/02 | (2006.01) |
| B63B 25/14 | (2006.01) |
| F02M 31/16 | (2006.01) |
| F17C 1/00 | (2006.01) |
| B63H 21/00 | (2006.01) |

(52) U.S. Cl.
CPC .............. B63H 21/00 (2013.01); B63H 21/38 (2013.01); F02M 21/02 (2013.01); F02M 21/023 (2013.01); F02M 21/0212 (2013.01); F02M 21/0215 (2013.01); F02M 21/0221 (2013.01); F02M 21/0245 (2013.01); F02M 21/0248 (2013.01); F02M 21/0287 (2013.01); F02M 31/16 (2013.01); F17C 1/002 (2013.01); F17C 7/02 (2013.01); F17C 9/02 (2013.01); F17C 13/082 (2013.01); F25J 1/004 (2013.01); F25J 1/0025 (2013.01); F25J 1/0042 (2013.01); F25J 1/0202 (2013.01); F25J 1/023 (2013.01); F25J 1/0277 (2013.01); F17C 2201/0157 (2013.01); F17C 2201/052 (2013.01); F17C 2221/033 (2013.01); F17C 2223/0161 (2013.01); F17C 2223/033 (2013.01); F17C 2265/034 (2013.01); F17C 2265/037 (2013.01); F17C 2265/066 (2013.01); F17C 2270/0107 (2013.01); Y02T 10/32 (2013.01); Y02T 70/5209 (2013.01); Y02T 90/46 (2013.01)

(56) References Cited

U.S. PATENT DOCUMENTS

| | | | |
|---|---|---|---|
| 3,919,852 | A | 11/1975 | Jones |
| 4,878,923 | A | 11/1989 | Muller |
| 8,117,852 | B2 | 2/2012 | Mak |
| 8,727,821 | B2 | 5/2014 | Kwon et al. |
| 9,168,993 | B1 | 10/2015 | Lee et al. |
| 9,239,186 | B2 | 1/2016 | Jung et al. |
| 2004/0068993 | A1 | 4/2004 | Irie et al. |
| 2008/0276627 | A1 | 11/2008 | Lee et al. |
| 2009/0126400 | A1 | 5/2009 | Pozivil |
| 2011/0056238 | A1 | 3/2011 | Mak |
| 2011/0146341 | A1 | 6/2011 | Melaaen |
| 2011/0185748 | A1 | 8/2011 | Fuchs |
| 2011/0277497 | A1 | 11/2011 | Lee et al. |
| 2012/0252285 | A1 | 10/2012 | Lee et al. |
| 2013/0340474 | A1 | 12/2013 | Jung et al. |
| 2014/0053600 | A1 | 2/2014 | Jung et al. |
| 2014/0060110 | A1 | 3/2014 | Jung et al. |
| 2014/0069117 | A1 | 3/2014 | Jung et al. |
| 2014/0069118 | A1 | 3/2014 | Jung et al. |
| 2014/0290279 | A1 | 10/2014 | Lee et al. |
| 2015/0226379 | A1 | 8/2015 | Lee et al. |
| 2015/0285189 | A1 | 10/2015 | Lee et al. |
| 2015/0300301 | A1 | 10/2015 | Lee et al. |
| 2015/0316208 | A1 | 11/2015 | Bae et al. |
| 2016/0114876 | A1 | 4/2016 | Lee et al. |
| 2016/0215929 | A1 | 7/2016 | Lee et al. |

FOREIGN PATENT DOCUMENTS

| | | |
|---|---|---|
| EP | 1990272 A1 | 11/2008 |
| EP | 2808633 A2 | 12/2014 |
| GB | 1401584 A | 7/1975 |
| GB | 1472533 A | 5/1977 |
| JP | 49-88904 A | 8/1974 |
| JP | 63-302169 A | 12/1988 |
| JP | 3-336193 A | 12/1994 |
| JP | 2001-132896 A | 5/2001 |
| JP | 2005-273681 A | 10/2005 |
| JP | 2006-349084 A | 12/2006 |
| JP | 2008-528882 A | 7/2008 |
| JP | 2009-504838 A | 2/2009 |
| JP | 2010-537151 A | 12/2010 |
| JP | 2012-76561 A | 4/2012 |
| JP | 2012-516263 A | 7/2012 |
| JP | 2013-508216 A | 3/2013 |
| KR | 10-0823029 B1 | 4/2008 |
| KR | 10-2008-0099209 A | 11/2008 |
| KR | 10-2009-0025514 A | 3/2009 |
| KR | 10-0891958 B1 | 4/2009 |
| KR | 10-2010-0049213 A | 5/2010 |
| KR | 10-2010-0098166 A | 9/2010 |
| KR | 10-2010-0099441 A | 9/2010 |
| KR | 10-2010-0107298 A | 10/2010 |
| KR | 10-1026180 B1 | 3/2011 |
| KR | 10-2011-0042910 A | 4/2011 |
| KR | 10-2011-0073825 A | 4/2011 |
| KR | 10-2011-0050239 A | 5/2011 |
| KR | 10-1049229 B1 | 7/2011 |
| KR | 10-2011-0121134 A | 11/2011 |
| KR | 10-1106088 B1 | 1/2012 |
| KR | 10-2012-0049731 A | 5/2012 |
| KR | 2012-0049199 A | 5/2012 |
| KR | 10-2012-0107832 A | 10/2012 |
| KR | 10-2012-0107888 A | 10/2012 |
| KR | 10-2012-0109743 A | 10/2012 |
| KR | 10-2012-0114055 A | 10/2012 |
| KR | 10-2013-0021204 A | 3/2013 |
| KR | 10-2013-0061798 A | 6/2013 |
| KR | 10-2012-0107831 A | 10/2014 |
| RU | 2243445 C1 | 12/2004 |
| RU | 118596 U1 | 7/2012 |
| RU | 2481234 C1 | 5/2013 |
| SG | 11201402322 S | 10/2014 |
| SG | 11201503110 T | 6/2015 |
| SG | 11201503111 R | 6/2015 |
| SG | 11201503115 W | 6/2015 |
| SG | 11201504439 Y | 7/2015 |
| SU | 543360 A3 | 1/1977 |
| UA | 96052 C1 | 5/2013 |
| WO | 84/01339 A1 | 4/1984 |
| WO | 2009/006693 A1 | 1/2009 |
| WO | 2009/136793 A1 | 11/2009 |
| WO | 2010/101356 A2 | 9/2010 |
| WO | 2011/078689 A1 | 6/2011 |
| WO | 2012/128447 A1 | 9/2012 |
| WO | 2012/128448 A1 | 9/2012 |
| WO | 2012/128449 A1 | 9/2012 |
| WO | 2014/209029 A1 | 12/2014 |

OTHER PUBLICATIONS

Japanese Office Action dated Mar. 8, 2016 of corresponding Japanese Office Action No. 2015-535580—4 pages.
Russian Office Action dated May 5, 2016 of corresponding Russian Patent Application No. 2015119530/06—6 pages.
First Action Interview Pre-Interview Communication dated Aug. 5, 2015 of related U.S. Appl. No. 14/692,637—9 pages.

(56) References Cited

OTHER PUBLICATIONS

First Action Interview Pre-Interview Communication dated Jul. 17, 2015 of related U.S. Appl. No. 14/692,639—8 pages.
Hatanaka et al., "A Challenge to Advance LNG Transport for the 21st Century—LNG Jamal: New LNG Carrier with Reliquefaction Plant", International Conference on LNG, Jan. 2001, vol. 13, pp. 6/2.1-6/2.8.
"Hyundai LNG Carrier—Now and in the Future", Presented at Ship Efficiency 2013, Sep. 23, 2013—46 pages.
International Search Report and Written Opinion dated Feb. 6, 2014 of related PCT Application No. PCT/KR2013/009540 which is the parent application of related U.S. Appl. No. 14/360,269—13 pages.
International Search Report dated Feb. 6, 2014 of related PCT Application No. PCT/KR2013/009542 which is the parent application of related U.S. Appl. No. 14/692,639—5 pages.
International Search Report dated Jan. 23, 2014 of related PCT Application No. PCT/KR2013/009541 which is the parent application of related U.S. Appl. No. 14/692,637—4 pages.
International Search Report dated Mar. 6, 2014 of related PCT Application No. PCT/KR2013/011078 which is the parent application of related U.S. Appl. No. 14/651,514—5 pages.
International Search Report dated Sep. 29, 2014 of PCT Application No. PCT/KR2014/005672 which is the parent application of U.S. Appl. No. 14/895,201—6 pages.
Japanese Office Action dated Mar. 15, 2016 of Japanese Patent Application No. 2015-535579 corresponding to U.S. Appl. No. 14/692,639—7 pages.
Laursen, "Gas Fueled Two-Stroke Ship Engines," Market overview—Nov. 27, 2013—19 pages.
Russian Office Action dated Apr. 29, 2016 of Russian Patent Application No. 2015104804/06(007550) corresponding to U.S. Appl. No. 14/360,269—6 pages.
Written Opinion and Search Report dated Feb. 1, 2016 of Singapore Patent Application No. 11201503115W corresponding to U.S. Appl. No. 14/692,639—13 pages.
Singapore Office Action dated Feb. 16, 2016 of Singapore Patent Application No. 11201402322S corresponding to U.S. Appl. No. 14/360,269—20 pages.
Chinese Office Action and Search Report dated Dec. 21, 2015 of Chinese Patent Application No. 2013800037160 related to U.S. Appl. No. 14/360,269—7 pages.
European Extended Search Report dated Oct. 16, 2015 of European Patent Application No. 13844586.1 related to U.S. Appl. No. 14/360,269—7 pages.
First Action Interview Office Action dated Oct. 22, 2015 of related U.S. Appl. No. 14/692,639.
International Search Report dated Jan. 23, 2014 of PCT/KR2013/009543 which is the parent application—4 pages.
Extended European Search Report dated Jun. 8, 2016 of corresponding European Patent Application No. 13848343.3—6 pages.
Extended European Search Report dated Jun. 8, 2016 of European Patent Application No. 13849580.9 corresponding to related U.S. Appl. No. 14/692,639—6 pages.
"ME-GI Dual Fuel MAN B&W Engines", Mar. 27, 2012, Taken from http://www.corporate.man.eu.man/media/content_medien/doc/global_corporate_website_1/verantwortung_1/megatrends_2/klimawandel/me_gi_dual_fuel_en_01.pdf—37 pages.
Office Action dated Sep. 9, 2016 of related U.S. Appl. No. 14/360,269—44 pages.
Japanese Office Action dated Jun. 6, 2017 of corresponding Japanese Patent Application No. 2015-535580—3 pages.
Chinese Office Action dated Sep. 28, 2016 of Chinese Patent Application No. 201380055569.1 corresponding to U.S. Appl. No. 15/091,465—6 pages.
Chinese Office Action dated Nov. 16, 2016 of Chinese Patent Application No. 201380003716.0 corresponding to related U.S. Appl. No. 14/360,269—9 pages.
Japanese Office Action dated Oct. 18, 2016 of corresponding Japanese Patent Application No. 2015-535580—3 pages.
Chinese Office Action dated Nov. 30, 2016 of Chinese Patent Application No. 201480036272.5 corresponding to U.S. Appl. No. 14/895,201—8 pages.
Extended European Search Report dated Dec. 8, 2016 of European Patent Application No. 14816835.4 corresponding to U.S. Appl. No. 14/895,201—6 pages.
Office Action dated Feb. 2, 2016 of copending U.S. Appl. No. 14/360,269—12 pages.
Office Action dated Dec. 9, 2016 of copending U.S. Appl. No. 14/692,639—53 pages.
Office Action dated Feb. 24, 2016 of copending U.S. Appl. No. 14/692,639—24 pages.
Office Action dated Feb. 8, 2017 of copending U.S. Appl. No. 14/360,269—11 pages.
Japanese Office Action dated Feb. 28, 2017 of Japanese Patent Application No. 2016-523648 corresponding to U.S. Appl. No. 14/895,201—7 pages.
Search Report and Written Opinion dated Jan. 20, 2017 of Singapore Patent Application No. 11201510075V corresponding to U.S. Appl. No. 14/895,201—8 pages.
Search Report dated Feb. 15, 2017 of Russian Patent Application No. 2015153066/11 corresponding to U.S. Appl. No. 14/895,201—4 pages.
Office Action dated Mar. 7, 2017 of copending U.S. Appl. No. 15/091,465—47 pages.

LIQUEFIED GAS TREATMENT SYSTEM FOR VESSEL

TECHNICAL FIELD

The present invention relates to a liquefied gas treatment system for a vessel.

BACKGROUND ART

Recently, the consumption of liquefied gas, such as liquefied natural gas (LNG) or liquefied petroleum gas (LPG), has been rapidly increasing throughout the world. Liquefied gas is transported in a gas state through onshore or offshore gas pipelines, or is transported to a remote consumption place while being stored in a liquefied state inside a liquefied gas carrier. Liquefied gas, such as LNG or LPG, is obtained by cooling natural gas or petroleum gas to a cryogenic temperature (in the case of LNG, about −163° C.). Since the volume of liquefied gas is considerably reduced as compared to a gas state, liquefied gas is very suitable for a long-distance marine transportation.

A liquefied gas carrier such as an LNG carrier is designed to load liquefied gas, sail across the sea, and unload the liquefied gas at an onshore consumption place. To this end, the liquefied gas carrier includes a storage tank (also called "cargo tank") that can withstand a cryogenic temperature of liquefied gas.

Examples of a marine structure provided with a cargo tank capable of storing cryogenic liquefied gas may include vessels such as a liquefied gas carrier and an LNG Regasification Vessel (LNG RV), or structures such as an LNG Floating Storage and Regasification Unit (LNG FSRU) and an LNG Floating, Production, Storage and Off-loading (LNG FPSO), and a Barge Mounted Power Plant (BMPP).

The LNG RV is a self-propelled, floatable liquefied gas carrier equipped with an LNG regasification facility, and the LNG FSRU is a marine structure that stores LNG unloaded from an LNG carrier on the sea far away from the land and, if necessary, supplies the LNG to an onshore consumption place by gasifying the LNG. The LNG FPSO is a marine structure that refines extracted LNG on the sea, stores the LNG in a storage tank after direct liquefaction, and, if necessary, transships the LNG to an LNG carrier. The BMPP is a structure that is equipped with a power generation facility to produce electricity on the sea.

The term "vessel" as used herein is a concept including a liquefied gas carrier such as an LNG carrier, an LNG RV, and structures such as an LNG FPSO, an LNG FSRU, and a BMPP.

Since the liquefaction temperature of natural gas is a cryogenic temperature of −163° C. at ambient pressure, LNG is likely to be vaporized even when the temperature of LNG is slightly higher than −163° C. at ambient pressure. In the case of a conventional LNG carrier, even though an LNG cargo tank is thermally insulated, external heat is continuously transferred to LNG. Therefore, during the transportation of LNG by the LNG carrier, LNG is continuously vaporized within the LNG cargo tank and boil-off gas (hereinafter, referred to as BOG) is generated within the LNG cargo tank.

The generated natural gas may increase the inside pressure of the cargo tank and accelerate the flow of the natural gas due to the rocking of the vessel, causing structural problems. Therefore, it is necessary to suppress the generation of BOG.

Conventionally, in order to suppress the generation of BOG within the cargo tank of the liquefied gas carrier, a method of discharging the BOG from the cargo tank and burning the BOG, a method of discharging the BOG from the cargo tank, reliquefying the BOG through a reliquefaction apparatus, and returning the BOG to the cargo tank, a method of using the BOG as fuel for a vessel's propulsion engine, and a method of suppressing the generation of BOG by maintaining an inside pressure of a cargo tank at a high level have been used solely or in combination.

In the case of a conventional vessel equipped with a BOG reliquefaction apparatus, BOG inside a cargo tank is discharged from the cargo tank and then reliquefied through a reliquefaction apparatus in order to maintain a pressure of the cargo tank at an appropriate level. In this case, the discharged BOG is reliquefied through heat exchange with a refrigerant (for example, nitrogen, mixed refrigerant, or the like) cooled to a cryogenic temperature in the reliquefaction apparatus including a refrigeration cycle, and the reliquefied BOG is returned to the cargo tank.

In the case of a conventional LNG carrier equipped with a DFDE propulsion system, BOG is consumed in such a manner that it is supplied as fuel to the DFDE after treating BOG by only a BOG compressor and heating, without installing the reliquefaction facility. Therefore, when an amount of fuel necessary for an engine is smaller than a generation amount of BOG, there is a problem that BOG is burnt in a gas combustion unit (GCU) or is vented to atmosphere.

Even though a conventional LNG carrier equipped with a reliquefaction facility and a low-speed diesel engine can treat BOG through the reliquefaction facility, the control of the entire system is complicated due to the operation complexity of the reliquefaction facility using nitrogen gas, and a considerable amount of power is consumed.

Consequently, there is a need for continuous research and development of systems and methods for efficiently treating liquefied gas, including BOG generated naturally from the cargo tank.

DISCLOSURE

Technical Problem

The present invention has been made in an effort to solve the above problems and is directed to a liquefied gas treatment system for a vessel, which includes a cargo tank storing LNG, and an engine supplied with the LNG stored in the cargo tank and using the LNG as fuel, wherein the BOG generated in the cargo tank and the LNG stored in the cargo tank are used in the engine as fuel, thereby achieving the efficient use of liquefied gas.

Technical Solution

According to an aspect of the present invention, there is provided a liquefied gas treatment system for a vessel, which includes a cargo tank storing LNG, and an engine using the LNG as fuel, the liquefied gas treatment system including: a compressor line configured to compress BOG generated in the cargo tank by a compressor and supply the compressed BOG to the engine as fuel; a high pressure pump line configured to compress the LNG stored in the cargo tank by a pump and supply the compressed LNG to the engine as fuel; and a heat exchanger configured to liquefy a part of BOG, which is compressed by the compressor, by exchanging heat with BOG that is discharged from the cargo tank and transferred to the compressor.

The liquefied gas treatment system may further include decompressing means configured to decompress the BOG liquefied by the heat exchanger.

The BOG, which is liquefied by the heat exchanger and decompressed by the decompressing means, may be returned to the cargo tank.

The liquefied gas treatment system may further include a gas-liquid separator configured to separate the BOG, which is decompressed to a gas-liquid mixed state while passing through the decompressing means, into a gas component and a liquid component.

A liquid component of the BOG, which is decompressed to a gas-liquid mixed state while passing through the decompressing means, may be returned to the cargo tank.

A liquid component of the BOG, which is decompressed to a gas-liquid mixed state while passing through the decompressing means, may be joined with the BOG which is discharged from the cargo tank and supplied to the compressor.

The liquefied gas treatment system may further include a cooler configured to cool the BOG, which is liquefied by the heat exchanger and is supplied to the decompressing means, by exchanging heat with the liquid component of the BOG which is decompressed to the gas-liquid mixed state while passing through the decompressing means.

The compressor may include a plurality of compression cylinders.

The BOG, which is compressed by the compressor and is transferred to the heat exchanger, may be compressed while passing through all or part of the plurality of compression cylinders included in the compressor.

The liquefied gas treatment system may further include a forcible vaporizer configured to forcibly vaporize the LNG stored in the cargo tank and supply the forcibly vaporized LNG to the compressor.

The decompressing means may be an expansion valve or an expander.

Advantageous Effects

According to the present invention, all BOG generated during the transportation of cargo (that is, LNG) in the LNG carrier can be used as the fuel of the engine, or may be reliquefied, be returned to the cargo tank and be stored therein. Therefore, an amount of BOG consumed in the GCU or the like can be reduced or removed. Furthermore, BOG can be treated by reliquefaction, without using separate refrigerants such as nitrogen.

Therefore, according to the liquefied gas treatment system of the present invention, BOG generated from the cargo tank can be reliquefied without installing a reliquefaction apparatus consuming a large amount of energy and requiring excessive initial installation cost, thereby saving energy consumed in the reliquefaction apparatus.

In addition, according to the liquefied gas treatment system of the present invention, a part of compressed BOG after pressurizing BOG discharged from a cargo tank can be supplied to a high pressure gas injection engine (that is, a propulsion system) as fuel. The remaining compressed BOG can be cooled with cold energy of BOG after discharge from the cargo and before compression, and returned to the cargo tank.

In addition, in the liquefied gas treatment system according to the present invention, since it is unnecessary to install the reliquefaction apparatuses using separate refrigerants (that is, nitrogen-refrigerant refrigeration cycle, mixed-refrigerant refrigeration cycle, or the like), facilities for supplying and storing the refrigerants need not be separately installed. Consequently, it is possible to save initial installation cost and operation cost for configuring the entire system.

In addition, according to the liquefied gas treatment system of the present invention, when BOG cooled and liquefied in the heat exchanger after compression is decompressed by the expander, wasted energy can be reused because energy can be generated during expansion

DETAILED DESCRIPTION OF EMBODIMENTS

Figure 1:
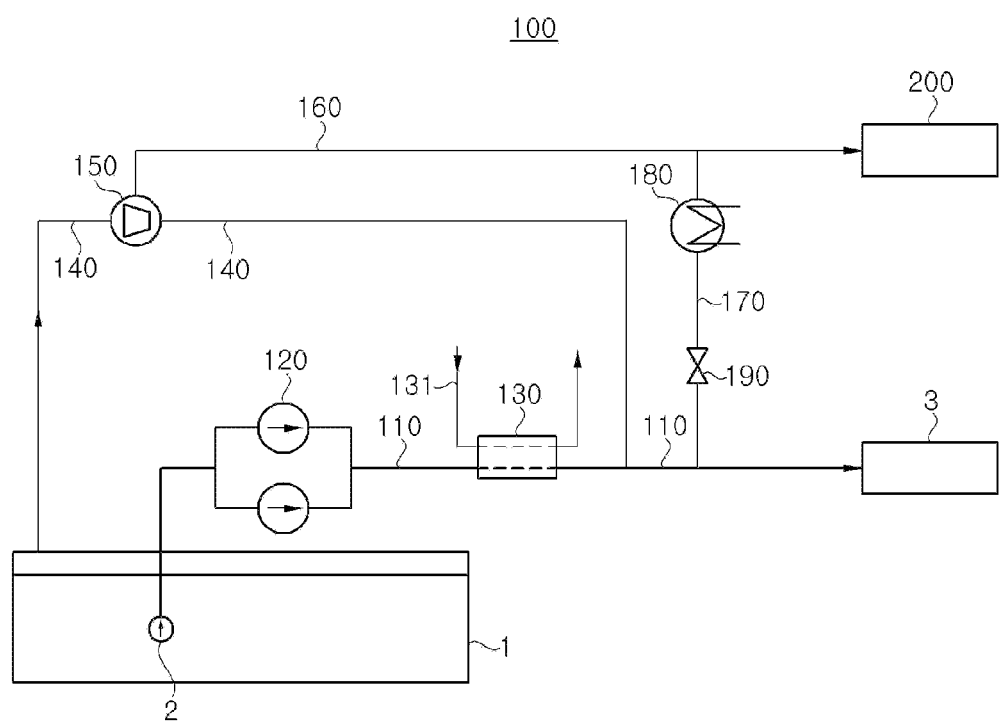
FIG. 1 is a schematic configuration diagram illustrating a liquefied gas treatment system for a vessel according to a first embodiment of the present invention.

Embodiments of the present invention will be described below in detail with reference to the accompanying drawings. These embodiments are provided so that this disclosure will be thorough and complete, and will fully convey the scope of the invention to those skilled in the art. The invention may, however, be embodied in many different forms and should not be construed as being limited to the embodiments set forth herein. Throughout the drawings and description, like reference numerals will be used to refer to like elements.

The International Maritime Organization (IMO) regulates the emission of nitrogen oxides (NOx) and sulfur oxides (SOx) among exhaust gases of ships and also tries to regulate the emission of carbon dioxide ($CO_2$). In particular, the issue of the regulation of nitrogen oxides (NOx) and sulfur oxides (SOx) was raised by the Prevention of Marine Pollution from Ships (MARPOL) protocol in 1997. After eight long years, the protocol met effectuation requirements and entered into force in May 2005. Currently, the regulation is in force as a compulsory provision.

Therefore, in order to meet such a provision, a variety of methods have been introduced to reduce the emission of nitrogen oxides (NOx). As one of these methods, a high-pressure natural gas injection engine for an LNG carrier, for example, an MEGI engine, has been developed and used. As compared with the diesel engine of the same power, the MEGI engine can reduce the emission of pollutants (carbon dioxide: 23%, nitrogen compound: 80%, sulfur compound: 95% or more). Hence, the MEGI engine is considered as an environment-friendly next-generation engine.

Such an MEGI engine may be installed in a vessel such as an LNG carrier which transports LNG while storing the LNG in a storage tank capable of withstanding a cryogenic temperature. The term "vessel" as used herein includes an LNG carrier, an LNG RV, and offshore plants such as an LNG FPSO and an LNG FSRU. In this case, the MEGI engine uses natural gas as fuel and requires a high pressure of about 150 to 400 bara (absolute pressure) for gas supply, depending on a load thereof.

The MEGI can be directly connected to the propeller for propulsion. To this end, the MEGI engine is provided with a 2-stroke engine rotating at a low speed. That is, the MEGI engine is a low-speed 2-stroke high pressure natural gas injection engine.

In addition, in order to reduce the emission of nitrogen oxide, a DF engine (for example, DFDG: dual fuel diesel generator) using a mixture of diesel oil and natural gas as fuel has been developed and used for propulsion or power generation. The DF engine is an engine that can burn a mixture of oil and natural gas, or can selectively use one of oil and natural gas as fuel. Since a content of sulfur is smaller than that in the case where only oil is used as fuel, a content of sulfur oxide is small in exhaust gas.

The DF engine need not supply fuel gas at a high pressure like the MEGI engine, and has only to supply fuel gas after compressing it to about several bar to several tens bara. The DF engine obtains power by driving a power generator through the driving force of the engine. This power can be used to drive a propulsion motor or operate various apparatuses or facilities.

When supplying natural gas as fuel, it is unnecessary to match the methane number in the case of the MEGI engine, but it is necessary to match the methane number in the case of the DF engine.

If LNG is heated, methane component having a relatively low liquefaction temperature is preferentially vaporized. Hence, since a methane content of BOG is high, the BOG can be directly supplied as fuel to the DF engine. However, since the methane content of the LNG is relatively lower than that of the BOG, the methane number of the LNG is lower than the methane number required in the DF engine. Ratios of hydrocarbon components (methane, ethane, propane, butane, and the like) constituting the LNG are different according to producing areas. Therefore, it is not suitable to vaporize the LNG as it is and then supply the vaporized LNG to the DF engine as fuel.

In order to adjust the methane number, the heavy hydrocarbon (HHC) component having a higher liquefaction point than methane can be liquefied and removed by forcibly vaporizing the LNG and lowering the temperature of the LNG. After the methane number is adjusted, it is possible to additionally heat natural gas whose methane number is adjusted according to the temperature condition required in the engine.

Hereinafter, configurations and operations of embodiments of the present invention will be described in detail with reference to the accompanying drawings. In addition, the following embodiments can be modified in various forms and are not intended to limit the scope of the present invention.

FIG. 1 is a configuration diagram illustrating a liquefied gas treatment system for a vessel according to a first embodiment of the present invention. The liquefied gas treatment system of the present embodiment may be applied to an LNG carrier equipped with an MEGI engine as a main propulsion engine (that is, propulsion means using LNG as fuel).

Referring to FIG. 1, the liquefied gas treatment system 100 according to the present embodiment includes a fuel supply line 110 and a BOG line 140. The fuel supply line 110 is configured to provide a passage for transferring LNG from a cargo tank 1 to a main engine 3 as a propulsion system. The BOG line 140 is configured to provide a passage for transferring BOG generated from the cargo tank 1 to the main engine 3. In addition, the liquefied gas treatment system 100 using BOG according to the present embodiment supplies LNG to the main engine 3 as fuel through the fuel supply line 110 by an LNG pump 120 and an LNG vaporizer 130, supplies BOG to the main engine 3 as fuel through the BOG line 140 after compressing the BOG by a BOG compressor 150, and supplies surplus BOG from the BOG compressor 150 to an integrated inert gas generator/gas combustion unit (IGG/GCU) system 200.

An MEGI engine usable as the main engine 3 needs to be supplied with fuel at a high pressure of about 150 to 400 bara (absolute pressure). Therefore, as the LNG pump 120 and the BOG compressor 150 according to the present embodiment, a high pressure pump and a high pressure compressor are used which can compress LNG and BOG to a pressure necessary for the MEGI engine, respectively.

The fuel supply line 110 provides a passage through which LNG supplied from the LNG cargo tank 1 by the driving of a transfer pump 2 is transferred to the main engine 3 as fuel, and the LNG pump 120 and the LNG vaporizer 130 are installed therein.

The LNG pump 120 is installed in the fuel supply line 110 to provide a pumping force necessary for transferring the LNG. As an example of the LNG pump 120, an LNG high pressure (HP) pump may be used. Like the present embodiment, a plurality of LNG pumps 120 may be installed in parallel.

The LNG vaporizer 130 is installed at a rear end of the LNG pump 120 in the fuel supply line 110 and vaporizes LNG transferred by the LNG pump 120. As an example, LNG is vaporized by heat exchange with a heat medium circulated and supplied through a heat medium circulation line 131. As another example, a variety of heating means, including heaters, may be used for providing a vaporization heat of LNG. In addition, the LNG vaporizer 130 may use a high pressure (HP) vaporizer that can be used at a high pressure for vaporization of LNG. Meanwhile, as an example of the heat medium circulated and supplied through the heat medium circulation line 131, steam generated from a boiler or the like may be used.

The BOG line 140 provides a passage for transferring BOG naturally generated from the cargo tank 1 to the main engine 3. Like the present embodiment, the BOG line 140 is connected to the fuel supply line 110 to supply BOG to the main engine 3 as fuel. Alternatively, the BOG line 140 may provide a passage for directly supplying BOG to the main engine 3.

The BOG compressor 150 is installed on the BOG line 140 to compress BOG passing through the BOG line 140. Although only one BOG compressor 150 is illustrated in FIG. 1, the system may be configured such that two BOG compressors of the same specification are connected in parallel so as to satisfy redundancy requirements just like the general fuel supply systems. However, like the present embodiment, when a single BOG compressor 150 is installed in a branched portion of a surplus BOG line 160 in the BOG line 140, it is possible to obtain additional effects of reducing burdens on costs for installation of the expensive BOG compressor 150 and burdens on maintenance.

The surplus BOG line 160 provides a passage for supplying surplus BOG from the BOG compressor 150 to an integrated IGG/GCU system 200. The surplus BOG line 160 can supply surplus BOG as fuel to an auxiliary engine, such as a DF engine, as well as the integrated IGG/GCU system 200.

The integrated IGG/GCU system 200 is a system in which an IGG and a GCU are integrated.

Meanwhile, the surplus BOG line 160 and the fuel supply line 110 may be connected together by a connection line 170. Therefore, due to the connection line 170, surplus BOG can be used as the fuel of the main engine 3, or vaporized LNG can be used as the fuel of the integrated IGG/GCU system 200. A heater 180 may be installed in the connection line 170 so as to heat BOG or vaporized LNG passing therethrough, and a pressure reduction valve (PRV) 190 may be installed to reduce excessive pressure by adjusting a pressure caused by BOG or vaporized LNG. Meanwhile, the heater 180 may be a gas heater using combustion heat of gas. Also, the heater 180 may use a variety of heating means, including a heat medium circulation/supply unit providing a heat source for heating by the circulation of the heat medium.

The operation of the liquefied gas treatment system according to the first embodiment of the present invention will be described below.

When a pressure inside the cargo tank 1 is equal to or higher than a set pressure or a large amount of BOG is generated, BOG is compressed by the driving of the BOG compressor 150 and is then supplied as fuel to the main engine 3. In addition, when the pressure inside the cargo tank 1 is lower than the set pressure or a small amount of BOG is generated, LNG is transferred and vaporized by the driving of the LNG pump 120 and the LNG vaporizer 130 and is then supplied as fuel to the main engine 3.

Meanwhile, surplus BOG from the BOG compressor 150 is supplied to the integrated IGG/GCU system 200 or the auxiliary engine such as the DF engine through the surplus BOG line 160. The surplus BOG is consumed or is used for generating inert gas for supply to the cargo tank 1. Furthermore, the surplus BOG may be used as the fuel of the auxiliary engine or the like.

The integrated IGG/GCU system 200 supplied with BOG may consume BOG continuously generated from the cargo tank 1 by BOG combustion inside a main body 210 and may, if necessary, generate combustion gas as inert gas for supply to the cargo tank 1.

Figure 2:
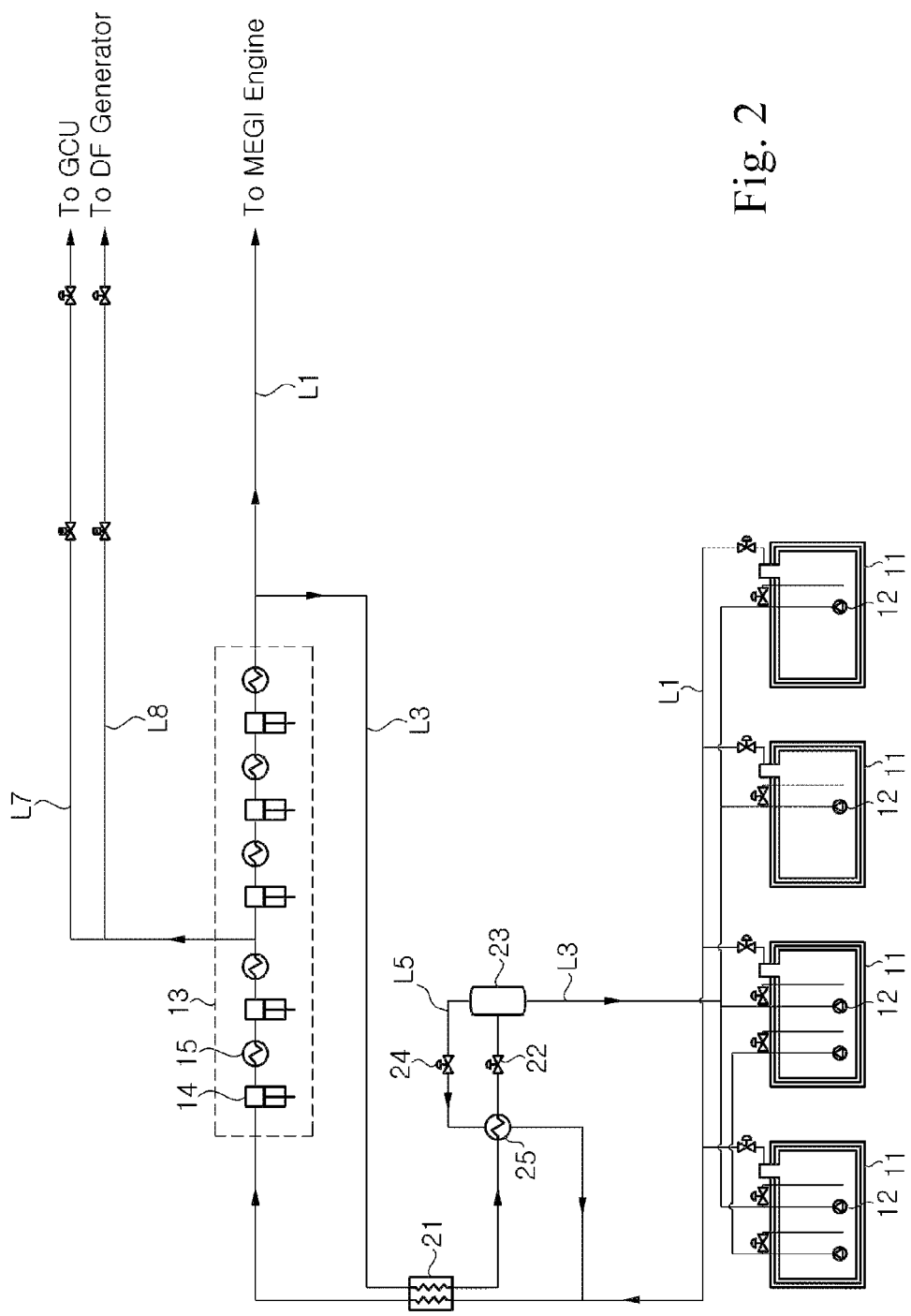
FIG. 2 is a schematic configuration diagram illustrating a liquefied gas treatment system for a vessel according to a second embodiment of the present invention.

FIG. 2 is a schematic configuration diagram illustrating a liquefied gas treatment system for a vessel according to a second embodiment of the present invention.

Although FIG. 2 illustrates an example in which the liquefied gas treatment system of the present invention is applied to an LNG carrier equipped with a high pressure natural gas injection engine capable of using natural gas as fuel (that is, propulsion means using LNG as fuel), the liquefied gas treatment system of the present invention can also be applied to any type of vessels (LNG carrier, LNG RV, and the like) and marine plants (LNG FPSO, LNG FSRU, BMPP, and the like), in which a liquefied gas cargo tank is installed.

In the liquefied gas treatment system for the vessel according to the second embodiment of the present invention, NBOG generated and discharged from a cargo tank 11 storing liquefied gas is transferred along a BOG supply line L1, is compressed in a compressor 13, and is then supplied to the high pressure natural gas injection engine, for example, an MEGI engine. The BOG is compressed at a high pressure of about 150 to 400 bara by the compressor 13 and is then supplied as fuel to the high pressure natural gas injection engine, for example, the MEGI engine.

The cargo tank 11 has sealing and heat-insulating walls so as to store liquefied gas such as LNG in a cryogenic state, but cannot perfectly block heat transferred from the outside. Therefore, the liquefied gas is continuously vaporized within the cargo tank 11. In order to maintain the pressure of the BOG at an appropriate level, BOG is discharged from the cargo tank 11 through the BOG discharge line.

A discharge pump 12 is installed within the cargo tank 11 so as to discharge LNG to the outside of the cargo tank when necessary.

The compressor 13 may include one or more compression cylinders 14 and one or more intercoolers 15 for cooling BOG of which the temperature is raised. The compressor 13 may be configured to compress BOG to, for example, about 400 bara. Although FIG. 2 illustrates the multi-stage compressor 13 including five compression cylinders 14 and five intercoolers 15, the number of the compression cylinders and the number of the intercoolers may be changed when necessary. In addition, a plurality of compression cylinders may be arranged within a single compressor, and a plurality of compressors may be connected in series.

BOG compressed in the compressor 13 is supplied to the high pressure natural gas injection engine through the BOG supply line L1. All or part of the compressed BOG may be supplied to the high pressure natural gas injection engine according to an amount of fuel necessary for the high pressure natural gas injection engine.

In addition, according to the embodiment of the present invention, when BOG discharged from the cargo tank 11 and compressed in the compressor 13 (that is, all BOG discharged from the cargo tank) is a first stream, the first stream of the BOG may be divided into a second stream and a third stream after compression. The second stream may be supplied as fuel to the high pressure natural gas injection engine, and the third stream may be liquefied and returned to the cargo tank.

At this time, the second stream is supplied to the high pressure natural gas injection engine through the BOG supply line L1. When necessary, the second stream may be supplied as fuel through a line (that is, the BOG supply line L1) connected to the high pressure natural gas injection engine after passing through all of the plurality of compression cylinders 14 included in the compressor 13, or may be supplied as fuel through a line (that is, the BOG branch line L8) connected to the DF engine after passing through a part of the plurality of compression cylinders 14 included in the compressor 13.

The third stream is returned to the cargo tank 11 through the BOG return line L3. A heat exchanger 21 is installed in the BOG return line L3 so as to cool and liquefy the third stream. In the heat exchanger 21, the third stream of the compressed BOG exchanges heat with the first stream of the BOG discharged from the cargo tank 11 and then supplied to the compressor 13.

Since a flow rate of the first stream of the BOG before compression is larger than a flow rate of the third stream, the third stream of the compressed BOG may be liquefied by receiving cold energy from the first stream of the BOG before compression. As such, in the heat exchanger 21, the BOG of the high pressure state is cooled and liquefied by heat exchange between the BOG of the cryogenic temperature immediately after being discharged from the cargo tank 11 and the BOG of the high pressure state compressed in the compressor 13.

The LBOG cooled in the heat exchanger 21 and liquefied at least partially is decompressed while passing through an expansion valve 22 serving as decompressing means, and is supplied to a gas-liquid separator 23 in a gas-liquid mixed state. The LBOG may be decompressed to approximately atmospheric pressure (for example, decompressed from 300 bar to 3 bar) while passing through the expansion valve 22. The liquefied BOG is separated into gas and liquid components in the gas-liquid separator 23. The liquid component, that is, LNG, is transferred to the cargo tank 11 through the BOG return line L3, and the gas component, that is, BOG, is discharged from the cargo tank 11 through a BOG recirculation line L5 and is joined with BOG supplied to the compressor 13. More specifically, the BOG recirculation line L5 extends from an upper end of the gas-liquid separator 23 and is connected to a more upstream side than the heat exchanger 21 in the BOG supply line L1.

In order to smoothly return the decompressed BOG to the cargo tank 11 and smoothly join the gas component of the decompressed BOG to the BOG supply line L1 through the BOG recirculation line L5, it is advantageous that the pressure of the BOG after being decompressed by the decompressing means is set to be higher than the inside pressure of the cargo tank 11.

For convenience of explanation, it has been described that the heat exchanger 21 is installed in the BOG return line L3, but the heat exchanger 21 may be installed in the BOG supply line L1 because the heat exchange is actually performed between the first stream of the BOG transferred through the BOG supply line L1 and the third stream of the BOG transferred through the BOG return line L3.

Another expansion valve 24 may be further installed in the BOG recirculation line L5. Therefore, the gas component discharged from the gas-liquid separator 23 may be decompressed while passing through the expansion valve 24. In addition, a cooler 25 is installed in the BOG recirculation line L5 so as to further cool the third stream by heat exchange between the third stream of the BOG liquefied in the heat exchanger 21 and supplied to the gas-liquid separator 23 and the gas component separated from the gas-liquid separator 23 and transferred through the BOG recirculation line L5. That is, the cooler 25 additionally cools the BOG of a high pressure liquid state to natural gas of a low pressure cryogenic gas state.

For convenience of explanation, it has been described that the cooler 25 is installed in the BOG recirculation line L5, but the cooler 25 may be installed in the BOG return line L3 because the heat exchange is actually performed between the third stream of the BOG transferred through the BOG return line L3 and the gas component transferred through the BOG recirculation line L5.

Although not illustrated, according to a modification of the present embodiment, the system may be configured such that the cooler 25 is omitted. If the cooler 25 is not installed, the total efficiency of the system may be slightly lowered. However, the pipe arrangement and the system operation may be facilitated, and the initial installation cost and the maintenance fee may be reduced.

Meanwhile, when it is expected that surplus BOG will be generated because an amount of BOG generated from the cargo tank 11 is larger than an amount of fuel necessary for the high pressure natural gas injection engine, BOG having been compressed or being compressed stepwise in the compressor 13 is branched through the BOG branch lines L7 and L8 and is then used in BOG consuming means. Examples of the BOG consuming means may include a GCU, a DF generator (DFDG), and a gas turbine, each of which can use natural gas having a relatively lower pressure than the MEGI engine as fuel. At the middle stage of the compressor 13, the pressure of the BOG branched through the BOG branch lines L7 and L8 may be about 6 to 10 bara.

As described above, in the liquefied gas treatment system and method according to the embodiment of the present invention, BOG generated during the transportation of cargo (that is, LNG) in the LNG carrier may be used as the fuel of the engine, or may be reliquefied, be returned to the cargo tank and be stored therein. Therefore, an amount of BOG consumed in the GCU or the like can be reduced or removed. Furthermore, BOG can be treated by reliquefaction, without installing reliquefaction apparatuses using separate refrigerants such as nitrogen.

In addition, in the liquefied gas treatment system and method according to the embodiment of the present invention, since it is unnecessary to install the reliquefaction apparatuses using separate refrigerants (that is, nitrogen-refrigerant refrigeration cycle, mixed-refrigerant refrigeration cycle, or the like), facilities for supplying and storing the refrigerants need not be separately installed. Consequently, it is possible to save initial installation cost and operation cost for configuring the entire system.

Figure 3:
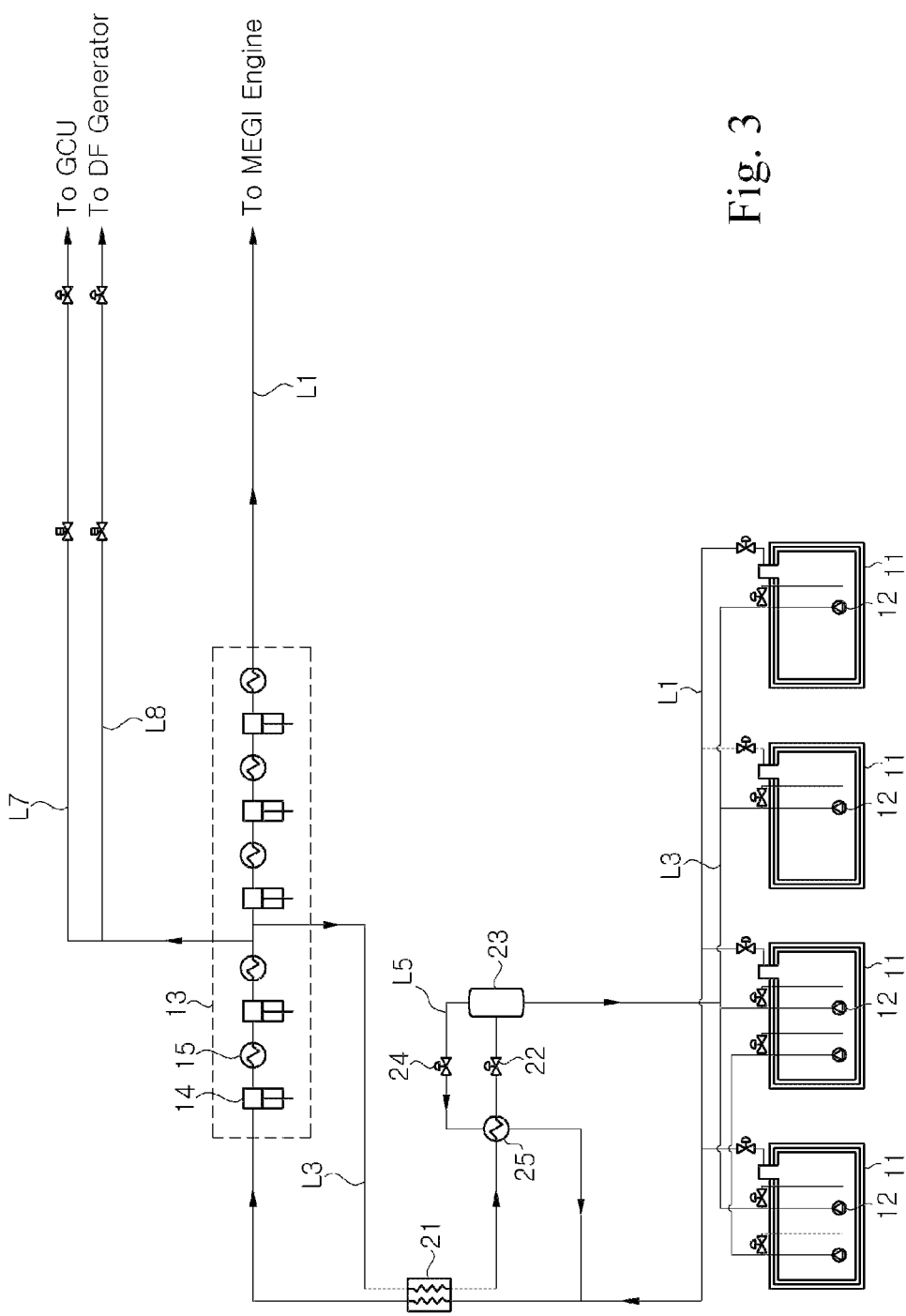
FIGS. 3 and 4 are schematic configuration diagrams illustrating liquefied gas treatment systems for a vessel according to modifications of the second embodiment of the present invention.
Figure 4:
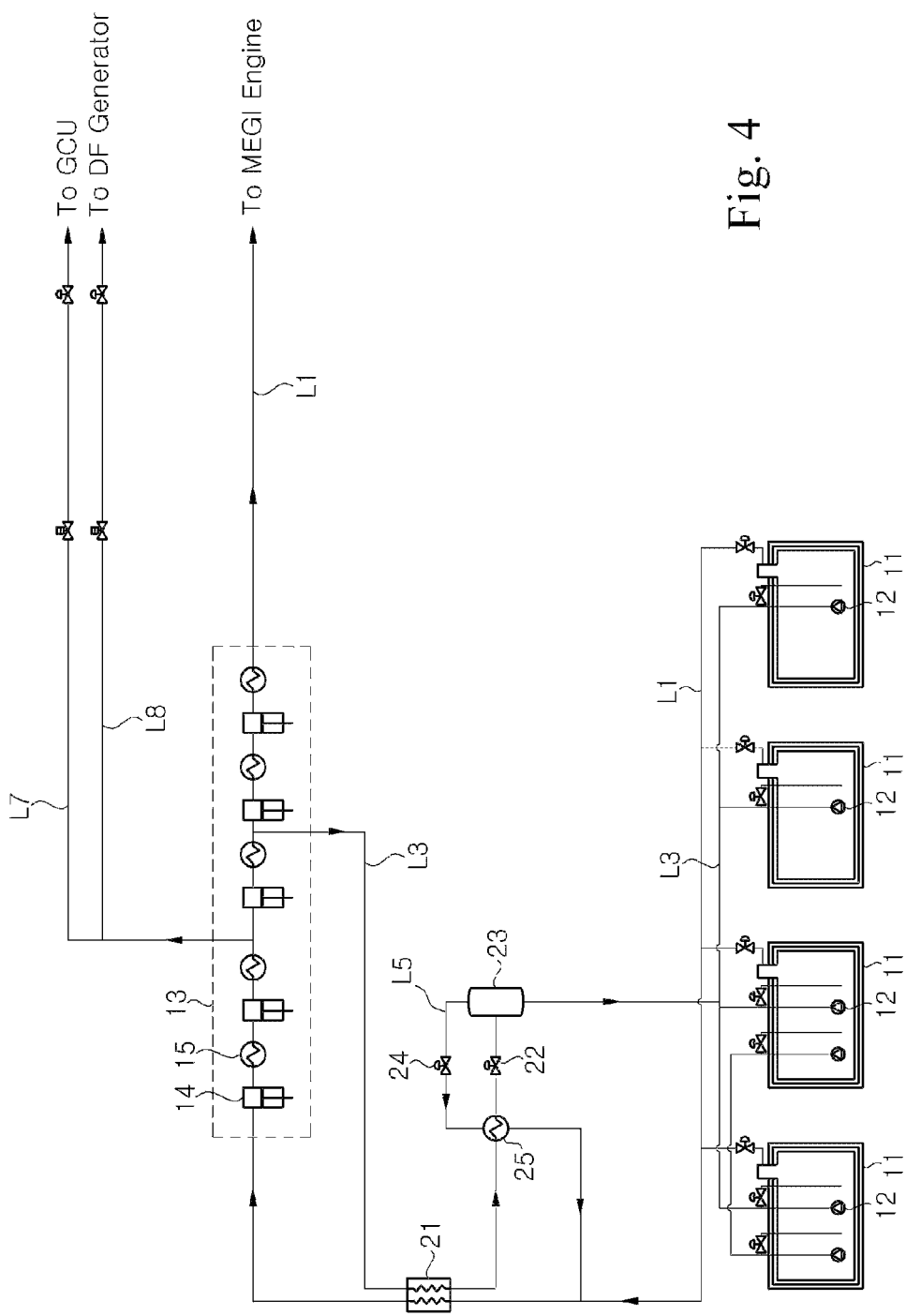

Although FIG. 2 illustrates the example in which the BOG return line L3 for supplying the compressed BOG to the heat exchanger 21 is branched at the rear end of the compressor 13, the BOG return line L3 may be installed to branch the BOG being compressed stepwise in the compressor 13, like the above-described BOG branch lines L7 and L8. FIG. 3 illustrates a modification in which 2-stage compressed BOG is branched by two cylinders, and FIG. 4 illustrates a modification in which 3-stage compressed BOG is branched by three cylinders. At this time, the pressure of the BOG branched from the middle stage of the compressor 13 may be about 6 to 10 bara.

In particular, in the case of using a compressor (manufactured by Burckhardt company) including five cylinders in which three cylinders of the front stage are operated in an oil-free-lubricated method and two cylinders of the rear stage are operated in an oil-lubricated method, BOG needs to be transferred while passing through an oil filter when BOG is branched at the rear stage or 4-stage or more of the compressor. However, it is advantageous in that the oil filter need not be used when BOG is branched at 3-stage or less of the compressor.

Figure 5:
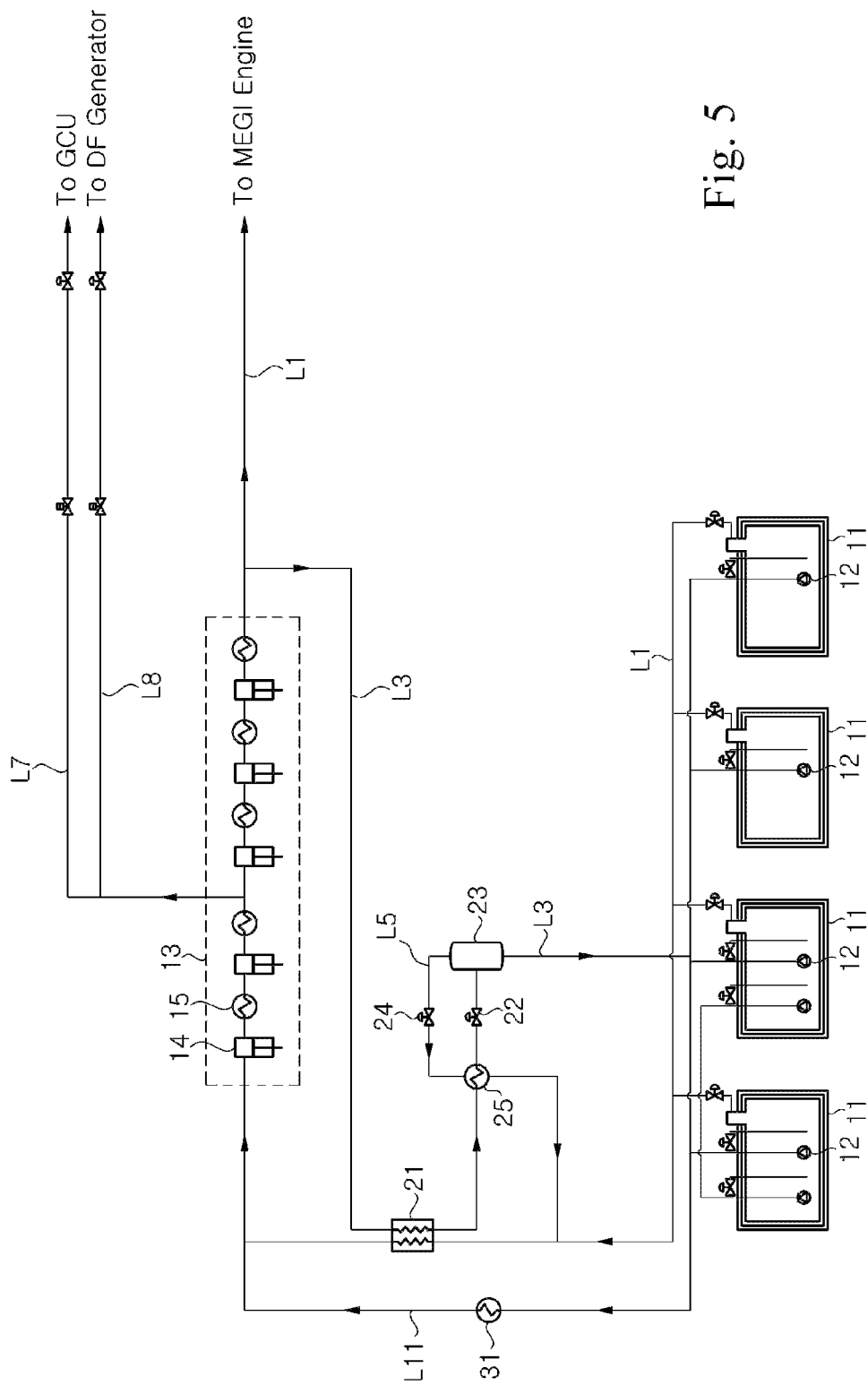
FIG. 5 is a schematic configuration diagram illustrating a liquefied gas treatment system for a vessel according to a third embodiment of the present invention.

FIG. 5 is a schematic configuration diagram illustrating a liquefied gas treatment system for a vessel according to a third embodiment of the present invention.

The liquefied gas treatment system according to the third embodiment differs from the liquefied gas treatment system according to the second embodiment in that LNG can be used after forcible vaporization when an amount of BOG necessary for the MEGI engine or the DF generator is larger than an amount of BOG generated naturally in the cargo tank 11. Hereinafter, only a difference from the liquefied gas treatment system of the second embodiment will be described in more detail. In addition, the same reference numerals are assigned to the same elements as those of the second embodiment, and a detailed description thereof will be omitted.

The liquefied gas treatment system for the vessel according to the third embodiment of the present invention is identical to that according to the second embodiment in that NBOG generated and discharged from a cargo tank 11 storing liquefied gas is transferred along a BOG supply line L1, is compressed in a compressor 13, and is then supplied to the high pressure natural gas injection engine, for example, an MEGI engine, or NBOG is supplied to a DF engine (DF generator) while being multi-stage compressed in the compressor 13 and is then used as fuel therein.

However, the liquefied gas treatment system according to the third embodiment includes a forcible vaporization line L11 such that LNG stored in the cargo tank 11 can be vaporized in a forcible vaporizer 31 and be then supplied to the compressor 13 when an amount of BOG required as fuel in the high pressure natural gas injection engine or the DF engine is larger than an amount of BOG generated naturally in the cargo tank 11.

When the forcible vaporization line L11 is provided as in the third embodiment, fuel can be stably supplied even when a small amount of BOG is generated because a small amount of LNG is stored in the cargo tank 11, or an amount of BOG required as fuel in various engines is larger than an amount of BOG generated naturally in the cargo tank 11.

Figure 6:
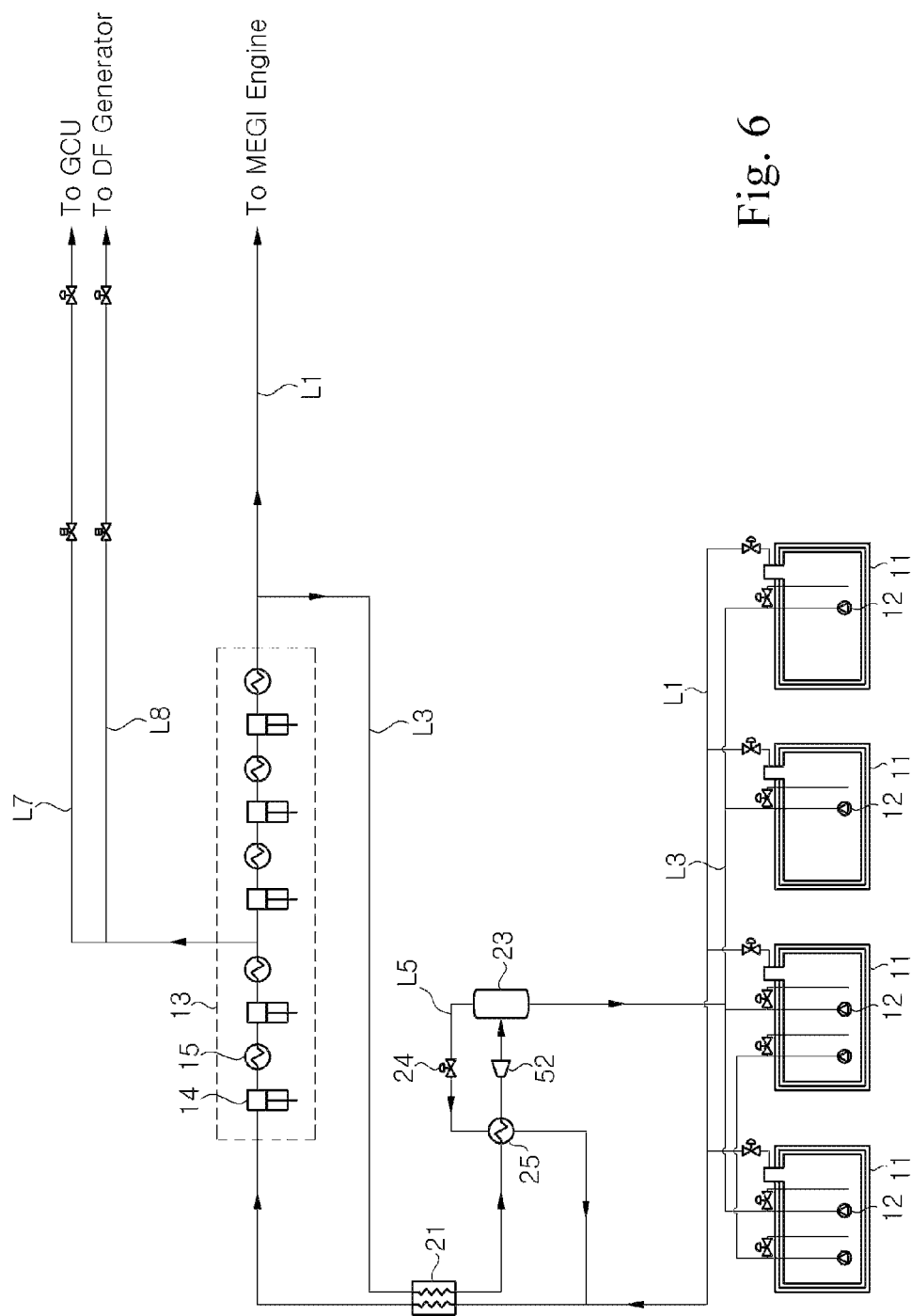
FIG. 6 is a schematic configuration diagram illustrating a liquefied gas treatment system for a vessel according to a fourth embodiment of the present invention.

FIG. 6 is a schematic configuration diagram illustrating a liquefied gas treatment system for a vessel according to a fourth embodiment of the present invention.

The liquefied gas treatment system according to the fourth embodiment differs from the liquefied gas treatment system according to the second embodiment in that an expander 52 instead of the expansion valve is used as the decompressing means. That is, according to the fourth embodiment, LBOG cooled in a heat exchanger 21 and liquefied at least partially is decompressed while passing through the expander 52 and is supplied to a gas-liquid separator 23 in a gas-liquid mixed state. Hereinafter, only a difference from the liquefied gas treatment system of the second embodiment will be described in more detail. In addition, the same reference numerals are assigned to the same elements as those of the second embodiment, and a detailed description thereof will be omitted.

The expander 52 produces energy while expanding the high pressure liquefied BOG at a low pressure. The LBOG may be decompressed to approximately atmospheric pressure while passing through the expander 52. The liquefied BOG is separated into gas and liquid components in the gas-liquid separator 23. The liquid component, that is, LNG, is transferred to the cargo tank 11 through a BOG return line L3, and the gas component, that is, BOG, is discharged from the cargo tank 11 through a BOG recirculation line L5 and is joined with BOG supplied to the compressor 13. More specifically, the BOG recirculation line L5 extends from an upper end of the gas-liquid separator 23 and is connected to a more upstream side than the heat exchanger 21 in the BOG supply line L1.

Another decompressing means, for example, an expansion valve 24, may be further installed in the BOG recirculation line L5. Therefore, the gas component discharged from the gas-liquid separator 23 may be decompressed while passing through the expansion valve 24.

Figure 7:
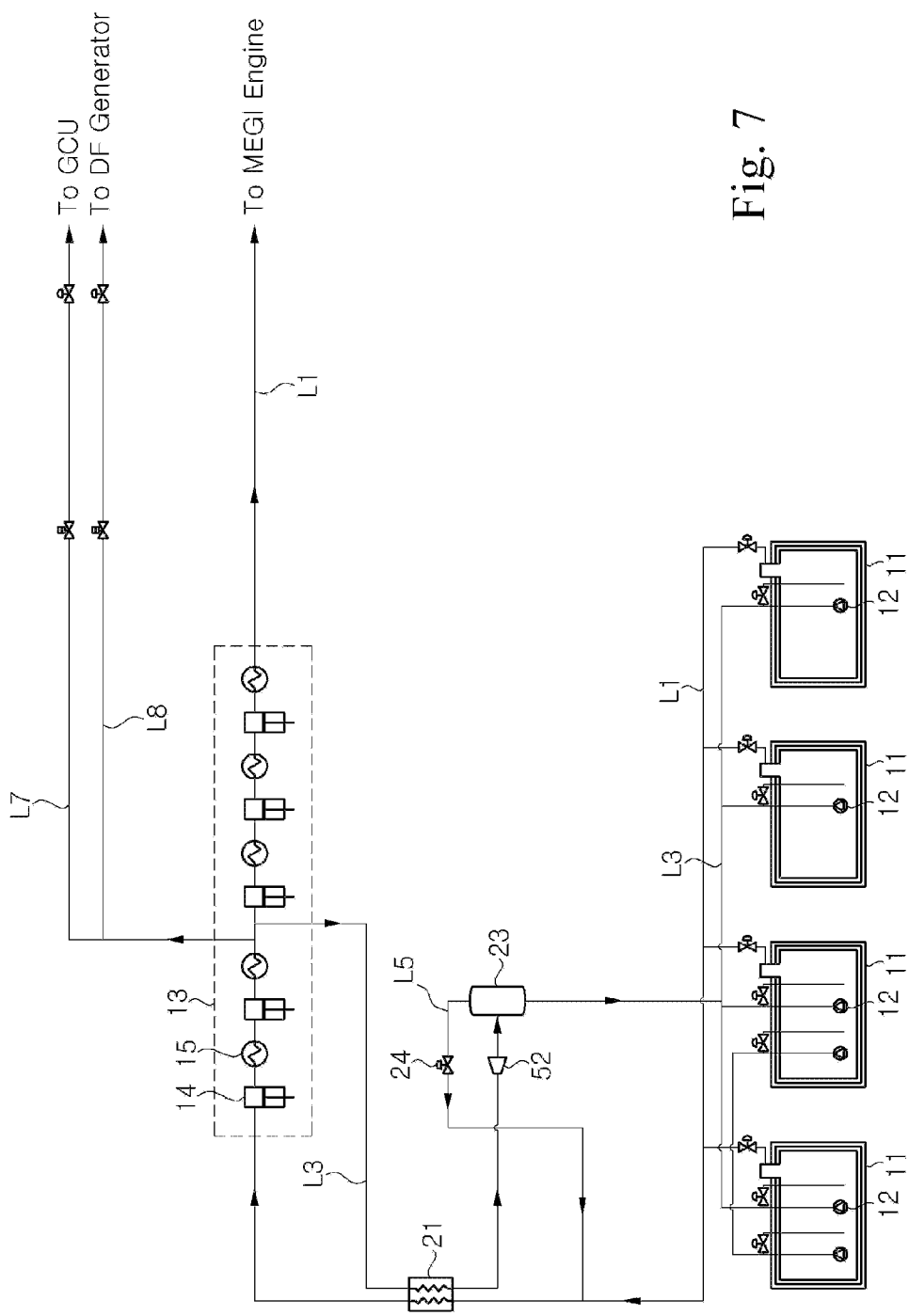
FIGS. 7 and 8 are schematic configuration diagrams illustrating liquefied gas treatment systems for a vessel according to modifications of the fourth embodiment of the present invention.
Figure 8:
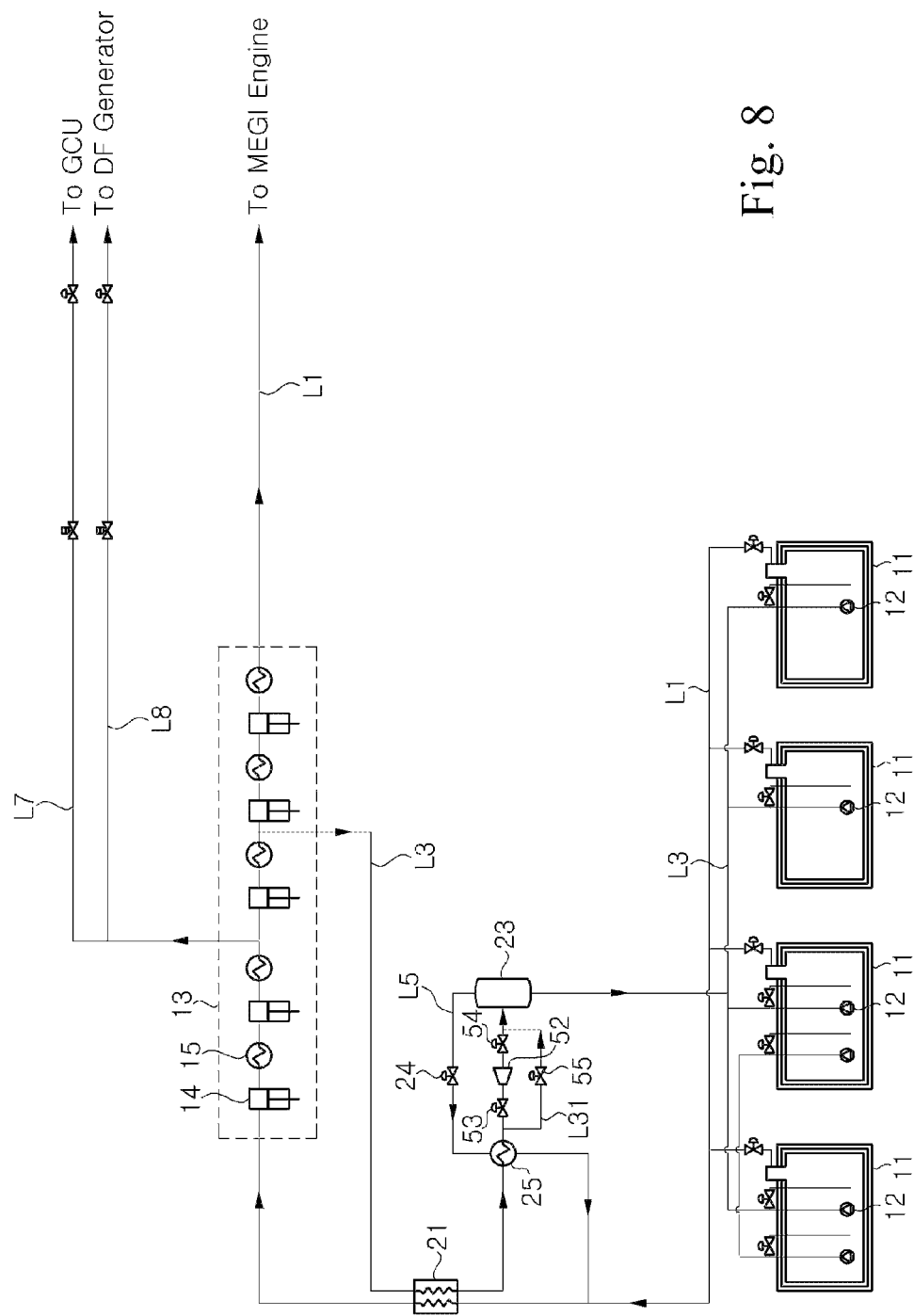

FIGS. 7 and 8 are schematic configuration diagrams illustrating liquefied gas treatment systems for a vessel according to modifications of the fourth embodiment of the present invention.

In the fourth embodiment illustrated in FIG. 6, the BOG return line L3 for supplying the compressed BOG to the heat exchanger 21 is branched at the rear end of the compressor 13. However, according to the modifications illustrated in FIGS. 7 and 8, as in the BOG branch lines L7 and L8 as described above or the BOG return line in the modification of the second embodiment as described with reference to FIGS. 3 and 4, the BOG return line L3 may be installed to branch BOG being compressed stepwise in the compressor 13.

FIG. 7 illustrates a modification in which 2-stage compressed BOG is branched by two cylinders, and FIG. 8 illustrates a modification in which 3-stage compressed BOG is branched by three cylinders. In particular, in the case of using a compressor (manufactured by Burckhardt company) including five cylinders in which three cylinders of the front stage are operated in an oil-free-lubricated method and two cylinders of the rear stage are operated in an oil-lubricated method, BOG needs to be transferred while passing through an oil filter when BOG is branched at the rear stage or 4-stage or more of the compressor. However, it is advantageous in that the oil filter need not be used when BOG is branched at 3-stage or less of the compressor.

In addition, referring to the first modification of the fourth embodiment illustrated in FIG. 7, the liquefied gas treatment system according to the fourth embodiment may be modified such that the cooler 25 (see FIG. 6) serving as the heat exchanger for additionally cooling the BOG cooled and liquefied while passing through the heat exchanger 21 is omitted. If the cooler 25 is not installed, the total efficiency of the system may be slightly lowered. However, the pipe arrangement and the system operation may be facilitated, and the initial installation cost and the maintenance fee may be reduced.

In addition, referring to the second modification of the fourth embodiment illustrated in FIG. 8, the liquefied gas treatment system according to the fourth embodiment may be modified such that the expander 52 and the expansion valve 55 serving as the decompressing means are arranged in parallel. At this time, the expander 52 and the expansion valve 55 arranged in parallel are disposed between the heat exchanger 21 and the gas-liquid separator 23. A bypass line L31, which is branched from the BOG return line L3 between the heat exchanger 21 and the gas-liquid separator 23 and is configured to bypass the expander 52, is installed so as to install the expansion valve 55 in parallel and use only the expander 52 or the expansion valve 55 when necessary. The expansion valve 55 is closed when the liquefied BOG is expanded by using only the expander 52, and on-off valves 53 and 54 installed respectively at the front end and the rear end of the expander 52 are closed when the liquefied BOG is expanded by using only the expansion valve 55.

Like the liquefied gas treatment system and method according to the foregoing embodiments, in the liquefied gas treatment system and method according to the fourth embodiment of the present invention, BOG generated during the transportation of cargo (that is, LNG) in the LNG carrier may be used as the fuel of the engine, or may be reliquefied, be returned to the cargo tank and be stored therein. Therefore, an amount of BOG consumed in the GCU or the like can be reduced or removed. Furthermore, BOG can be treated by reliquefaction, without installing reliquefaction apparatuses using separate refrigerants such as nitrogen.

Even when the liquefied gas treatment system and method according to the fourth embodiment of the present invention is applied to plants (LNG FPSO, LNG FSRU, BMPP, and the like) as well as vessels (LNG carrier, LNG RV, and the like), BOG generated from the cargo tank storing the LNG may be used as the fuel of the engine (including engines for power generation as well as engines for propulsion) or may be reliquefied, thereby reducing or removing the unnecessary waste of BOG.

In addition, in the liquefied gas treatment system and method according to the fourth embodiment of the present invention, since it is unnecessary to install the reliquefaction apparatuses using separate refrigerants (that is, nitrogen-refrigerant refrigeration cycle, mixed-refrigerant refrigeration cycle, or the like), facilities for supplying and storing the refrigerants need not be separately installed. Consequently, it is possible to save initial installation cost and operation cost for configuring the entire system.

Figure 9:
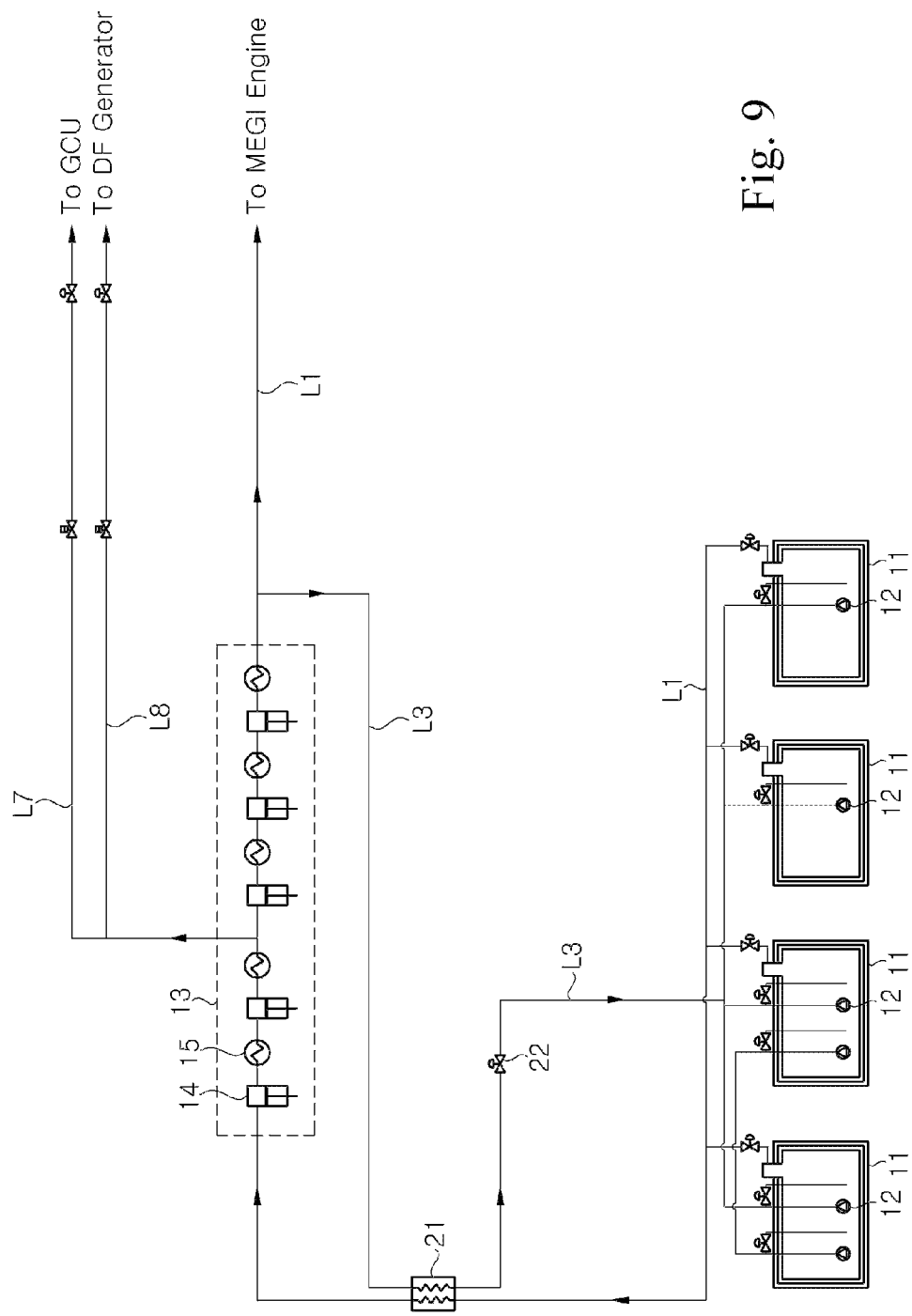
FIG. 9 is a schematic configuration diagram illustrating a liquefied gas treatment system for a vessel according to a fifth embodiment of the present invention.

FIG. 9 is a schematic configuration diagram illustrating a liquefied gas treatment system for a vessel according to a fifth embodiment of the present invention.

The liquefied gas treatment system according to the fifth embodiment differs from the liquefied gas treatment system according to the second embodiment in that BOG liquefied in the heat exchanger 21 and then decompressed in the decompressing means (for example, the expansion valve 22) is returned to the cargo tank 11, without passing through the gas-liquid separator 23. Hereinafter, only a difference from the liquefied gas treatment system of the second embodiment will be described in more detail. In addition, the same reference numerals are assigned to the same elements as those of the second embodiment, and a detailed description thereof will be omitted.

According to the present embodiment, the BOG (that is, two-phase BOG), which becomes a state in which the gas component (that is, flash gas) and the liquid component (that is, liquefied BOG) are mixed while being decompressed after liquefaction, is returned to the cargo tank 11 through the BOG return line L3. The BOG return line L3 may be configured such that the two-phase BOG returned to the cargo tank 11 is injected to the bottom of the cargo tank 11.

The gas component (that is, flash gas) of the two-phase BOG injected to the bottom of the cargo tank 11 may be partially melted into LNG stored in the cargo tank 11, or may be liquefied by cold energy of LNG. In addition, flash gas (BOG), which is not melted or liquefied, is discharged from the cargo tank 11 again through the BOG supply line L1 together with BOG (NBOG) additionally generated in the cargo tank 11. The flash gas discharged from the cargo tank 11 together with the newly generated BOG is recirculated to the compressor 13 along the BOG supply line L1.

According to the present embodiment, since the two-phase BOG after expansion is injected to the bottom of the cargo tank 11, a larger amount of BOG is liquefied by the LNG stored in the cargo tank 11. Furthermore, since the facilities such as the gas-liquid separator or the like are omitted, installation cost and operation cost can be saved.

Figure 10:
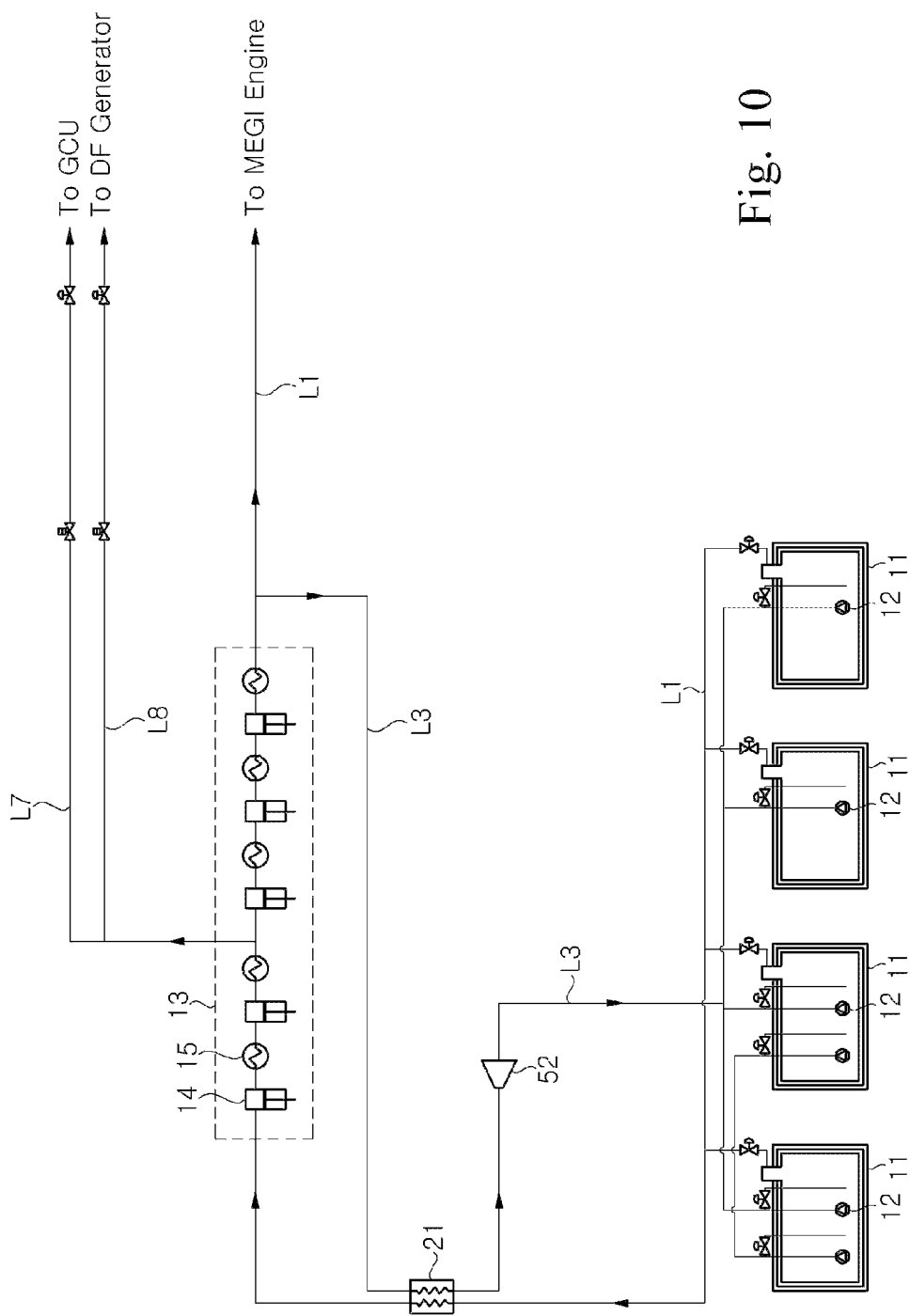
FIGS. 10 to 12 are schematic configuration diagrams illustrating liquefied gas treatment systems for a vessel according to modifications of the fifth embodiment of the present invention.

FIG. 10 is a schematic configuration diagram illustrating a liquefied gas treatment system for a vessel according to a first modification of the fifth embodiment of the present invention.

The first modification of the fifth embodiment illustrated in FIG. 10 differs from the liquefied gas treatment system illustrated in FIG. 9 according to the fifth embodiment in that an expander 52 instead of the expansion valve is used as the decompressing means. That is, according to the first modification of the fifth embodiment, LBOG cooled and liquefied in a heat exchanger 21 is decompressed to a gas-liquid mixed state while passing through the expander 52 and is returned to a cargo tank 11 in a two-phase state.

Figure 11:
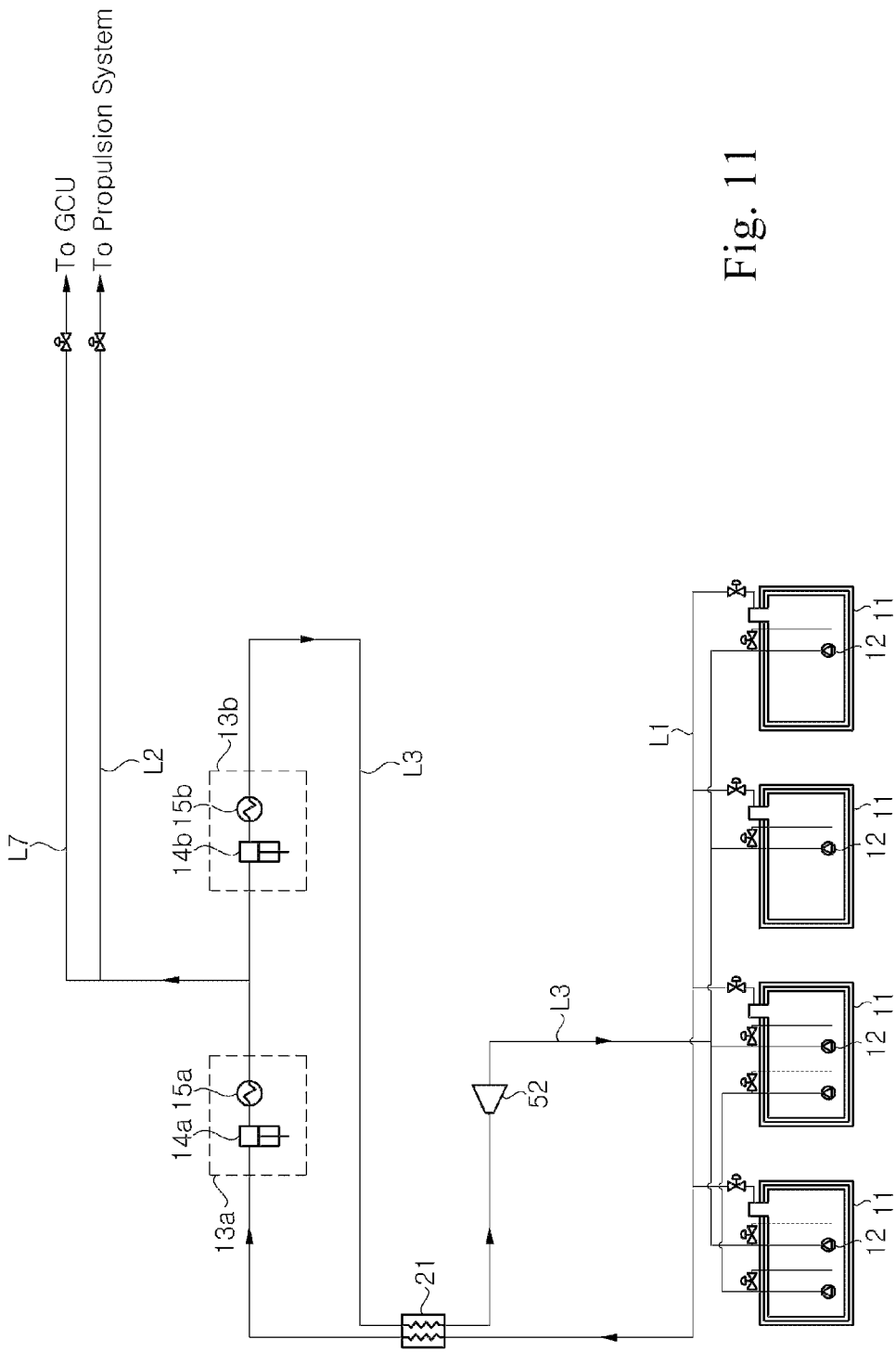

FIG. 11 is a schematic configuration diagram illustrating a liquefied gas treatment system for a vessel according to a second modification of the fifth embodiment of the present invention.

The second modification of the fifth embodiment illustrated in FIG. 11 differs from the liquefied gas treatment system illustrated in FIG. 9 according to the fifth embodiment in that a plurality of compressors (for example, a first compressor 13a and a second compressor 13b) instead of the multi-stage compressor is used as the compressing means.

In the liquefied gas treatment system for the vessel according to the second modification of the fifth embodiment of the present invention, NBOG generated and discharged from a cargo tank 11 storing liquefied gas is transferred along a BOG supply line L1 and is then supplied to the first compressor 13a. The BOG compressed in the first compressor 13a may be compressed at about 6 to 10 bara and then supplied to a demander, that is, a propulsion system (for example, DFDE) using LNG as fuel, along a fuel supply line L2. The BOG remaining after being supplied to the DFDE may be additionally compressed by the second compressor 13b serving as a booster compressor. Then, as in the above-described fifth embodiment, the BOG may be liquefied while moving along a BOG return line L3 and be then returned to the cargo tank 11.

The first compressor 13a may be a 1-stage compressor including one compression cylinder 14a and one intercooler 15a. The second compressor 13b may be a 1-stage compressor including one compression cylinder 14b and one intercooler 15b. If necessary, the second compressor 13b may be provided with a multi-stage compressor including a plurality of compression cylinders and a plurality of intercoolers.

The BOG compressed in the first compressor 13a is compressed at about 6 to 10 bara and then supplied to the demander, for example, the DF engine (that is, DFDE), through the fuel supply line L2. At this time, all or part of the compressed BOG may be supplied to the engine according to an amount of fuel necessary for the engine.

That is, when BOG discharged from the cargo tank 11 and supplied to the first compressor 13a (that is, all BOG discharged from the cargo tank 11) is a first stream, the first stream of the BOG may be divided into a second stream and a third stream at a downstream side of the first compressor 13a. The second stream may be supplied as fuel to the propulsion system, that is, the DF engine (DFDE), and the third stream may be liquefied and returned to the cargo tank 11.

At this time, the second stream is supplied to the DFDE through the fuel supply line L2, and the third stream is further compressed in the second compressor 13b, experiences liquefaction and decompression processes, and is returned to the cargo tank 11 through the BOG return line L3. A heat exchanger 21 is installed in the BOG return line L3 so as to liquefy the third stream of the compressed BOG. The third stream of the BOG compressed in the heat exchanger 21 exchanges heat with the first stream of the BOG discharged from the cargo tank 11 and then supplied to the first compressor 13a.

Since a flow rate of the first stream of the BOG before compression is larger than a flow rate of the third stream, the third stream of the compressed BOG may be cooled (that is, liquefied at least partially) by receiving cold energy from the first stream of the BOG before compression. As such, in the heat exchanger 21, the BOG of the high pressure state is cooled (liquefied) by heat exchange between the BOG of the cryogenic temperature immediately after being discharged from the cargo tank 11 and the BOG of the high pressure state compressed in the compressor 13.

The LBOG cooled in the heat exchanger 21 is decompressed while passing through an expansion valve 22 (for example, J-T valve) serving as decompression means, and is then supplied to the cargo tank 11 in a gas-liquid mixed state. The LBOG may be decompressed to approximately atmospheric pressure (for example, decompressed from 300 bar to 3 bar) while passing through the expansion valve 22.

Meanwhile, when it is expected that surplus BOG will be generated because an amount of BOG generated from the cargo tank 11 is larger than an amount of fuel necessary for the DF engine (for example, at the time of engine stop or during low-speed navigation), BOG compressed in the first compressor 13a is branched through the BOG branch line L7 and is then used in BOG consuming means. Examples of the BOG consuming means may include a GCU and a gas turbine, each of which can use natural gas as fuel.

Figure 12:
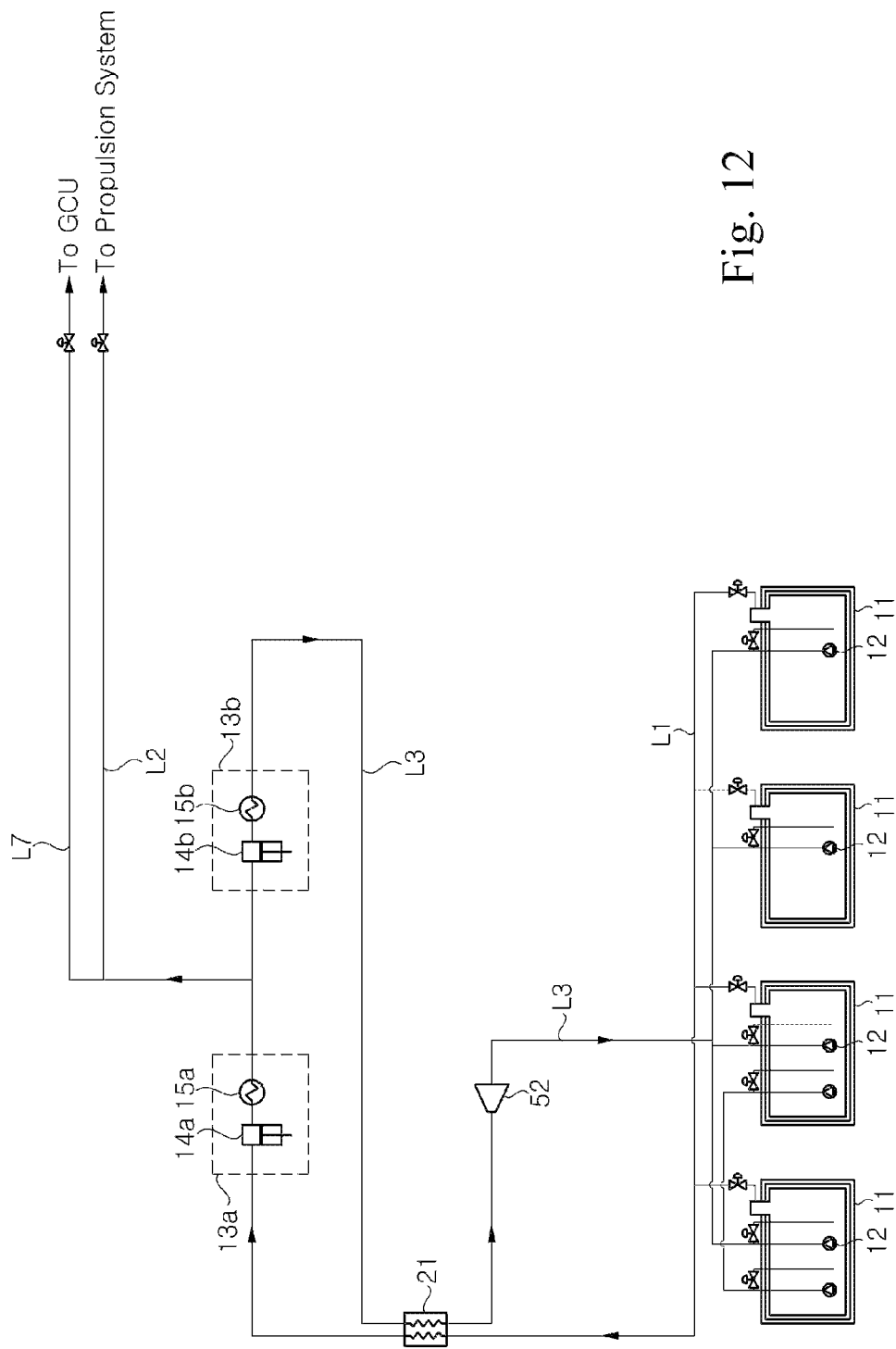

FIG. 12 is a schematic configuration diagram illustrating a liquefied gas treatment system for a vessel according to a third modification of the fifth embodiment of the present invention.

The third modification of the fifth embodiment illustrated in FIG. 12 differs from the liquefied gas treatment system illustrated in FIG. 11 according to the second modification of the fifth embodiment in that an expander 52 instead of the expansion valve is used as the decompressing means. That is, according to the third modification of the fifth embodiment, LBOG cooled and liquefied in a heat exchanger 21 is decompressed to a gas-liquid mixed state while passing through the expander 52 serving as the decompressing means and is returned to a cargo tank 11 in a two-phase state.

Like the liquefied gas treatment system and method according to the foregoing embodiments, in the liquefied gas treatment system and method according to the fifth embodiment of the present invention, BOG generated during the transportation of cargo (that is, LNG) in the LNG carrier may be used as the fuel of the engine, or may be reliquefied, be returned to the cargo tank and be stored therein. Therefore, an amount of BOG consumed in the GCU or the like can be reduced or removed. Furthermore, BOG can be treated by reliquefaction, without installing reliquefaction apparatuses using separate refrigerants such as nitrogen.

Even when the liquefied gas treatment system and method according to the fifth embodiment of the present invention is applied to plants (LNG FPSO, LNG FSRU, BMPP, and the like) as well as vessels (LNG carrier, LNG RV, and the like), BOG generated from the cargo tank storing the LNG may be used as the fuel of the engine (including engines for power generation as well as engines for propulsion) or may be reliquefied, thereby reducing or removing the unnecessary waste of BOG.

In addition, in the liquefied gas treatment system and method according to the fifth embodiment of the present invention, since it is unnecessary to install the reliquefaction apparatuses using separate refrigerants (that is, nitrogen-refrigerant refrigeration cycle, mixed-refrigerant refrigeration cycle, or the like), facilities for supplying and storing the refrigerants need not be separately installed. Consequently, it is possible to save initial installation cost and operation cost for configuring the entire system.

Figure 13:
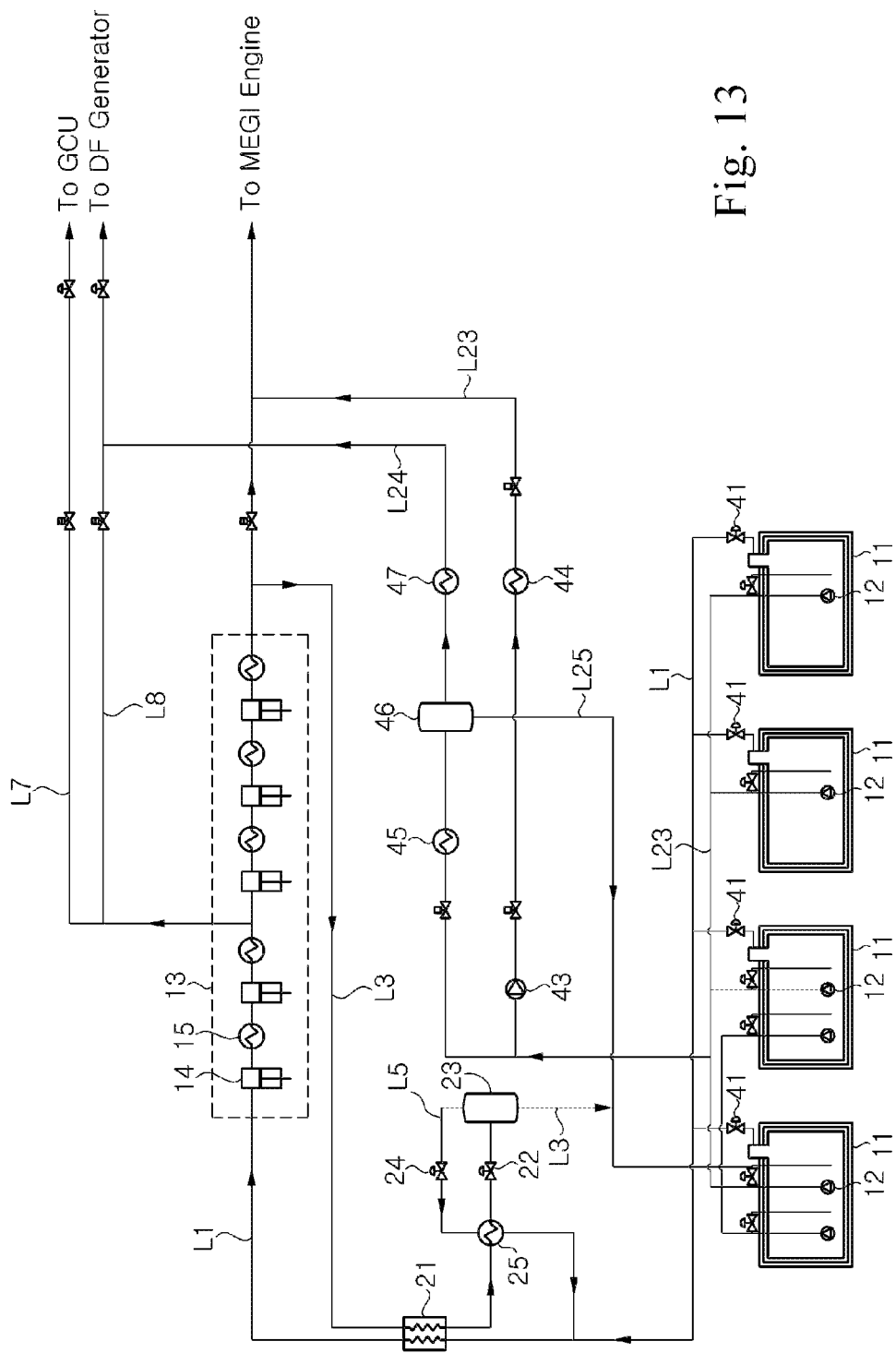
FIG. 13 is a schematic configuration diagram illustrating a liquefied gas treatment system for a vessel according to a sixth embodiment of the present invention.

FIG. 13 is a configuration diagram illustrating a liquefied gas treatment system for a vessel according to a sixth embodiment of the present invention.

The liquefied gas treatment system illustrated in FIG. 13 according to the sixth embodiment of the present invention is configured by integrating the liquefied gas treatment system illustrated in FIG. 1 according to the first embodiment (hybrid system including the line through which LNG is compressed by the high pressure pump 120 and supplied as fuel to the propulsion system, and the line through which BOG is compressed by the compressor 150 and supplied as fuel to the propulsion system) and the liquefied gas treatment system illustrated in FIG. 2 according to the second embodiment.

Although not illustrated, according to the present invention, it is obvious that the liquefied gas treatment systems illustrated in FIGS. 3 to 13 according to the third to fifth embodiments can also be integrated with the hybrid system (see L23, L24 and L25 of FIG. 13) as illustrated in FIG. 13.

The liquefied gas treatment system illustrated in FIG. 13 according to the present invention includes a high pressure natural gas injection engine (for example, MEGI engine) as a main engine, and a DF engine (DF generator: DFDG) as a sub engine. Generally, the main engine is used for propulsion to navigate the vessel, and the sub engine is used for power generation to supply power to various apparatuses and facilities installed in the vessel. However, the present invention is not limited to the purposes of the main engine and the sub engine. A plurality of main engines and a plurality of sub engines may be installed.

The liquefied gas treatment system according to the present invention is configured such that the natural gas stored in the cargo tank 11 (that is, the BOG of the gas state and the LNG of the liquid state) can be supplied as fuel to the engines (that is, the MEGI engine serving as the main engine and the DF engine serving as the sub engine).

In order to supply the BOG of the gas state as fuel gas, the liquefied gas treatment system according to the present embodiment includes a main BOG supply line L1 serving as a BOG supply line to supply the main engine with BOG stored in the cargo tank 11, and a sub BOG supply line L8 branched from the main BOG supply line L1 to supply the sub engine with BOG. The main BOG supply line L1 has the same configuration as the BOG supply line L1 of the foregoing embodiment. However, in the description given with reference to FIG. 13, this BOG supply line is referred to as the main BOG supply line L1 so as to distinguish from the BOG supply line for the DF engine (that is, the sub BOG supply line L8). In addition, the sub BOG supply line L8 has the same configuration as the BOG branch line L8 of the foregoing embodiment. However, in the description given with reference to FIG. 13, this BOG supply line is referred to as the sub BOG supply line L8 so as to distinguish from the main BOG supply line L1.

In order to supply the LNG of the liquid state as fuel gas, the liquefied gas treatment system according to the present embodiment includes a main LNG supply line L23 serving to supply the main engine with LNG stored in the cargo tank 11, and a sub LNG supply line L24 branched from the main LNG supply line L23 to supply the sub engine with LNG.

According to the present embodiment, a compressor 13 for compressing the BOG is installed in the main BOG supply line L1, and a high pressure pump 43 for compressing the LNG is installed in the main LNG supply line L23.

The NBOG generated in the cargo tank 11 storing liquefied gas and discharged through the BOG discharge valve 41 is transferred along the main BOG supply line L1, is compressed in the compressor 13, and is then supplied to the high pressure natural gas injection engine, for example, the MEGI engine. The BOG is compressed at a high pressure of about 150 to 400 bara by the compressor 13 and is then supplied to the high pressure natural gas injection engine.

The cargo tank 11 has sealing and heat-insulating walls so as to store liquefied gas such as LNG in a cryogenic state, but cannot perfectly block heat transferred from the outside. Therefore, the liquefied gas is continuously vaporized within the cargo tank 11, and BOG is discharged from the cargo tank 11 so as to maintain the pressure of the BOG at an appropriate level.

The compressor 13 may include one or more compression cylinders 14 and one or more intercoolers 15 for cooling BOG of which the temperature is raised. The compressor 13 may be configured to compress BOG to, for example, about 400 bara. Although FIG. 13 illustrates the multi-stage compressor 13 including five compression cylinders 14 and five intercoolers 15, the number of the compression cylinders and the number of the intercoolers may be changed when necessary. In addition, a plurality of compression cylinders may be arranged within a single compressor, and a plurality of compressors may be connected in series.

The BOG compressed in the compressor 13 is supplied to the high pressure natural gas injection engine through the main BOG supply line L1. All or part of the compressed BOG may be supplied to the high pressure natural gas injection engine according to an amount of fuel necessary for the high pressure natural gas injection engine.

The sub BOG supply line L8 for supply fuel gas to the sub engine (that is, the DF engine) is branched from the main BOG supply line L1. More specifically, the sub BOG supply line L8 is branched from the main BOG supply line L1 such that BOG can be branched in the process of being multi-stage compressed in the compressor 13. Although FIG. 13 illustrates that the 2-stage compressed BOG is branched and a part of the BOG is supplied to the sub engine through the sub BOG supply line L8, this is merely an example. The system can also be configured such that 1-stage compressed BOG or 3- to 5-stage compressed BOG is branched and then supplied to the sub engine through the sub BOG supply line. As an example of the compressor, a compressor manufactured by Burckhardt company may be used. The compressor manufactured by Burckhardt company includes five cylinders. It is known that the three cylinders of the front stage are operated in an oil-free-lubricated method and two cylinders of the rear stage are operated in an oil-lubricated method. Therefore, in the case where the compressor manufactured by Burckhardt company is used as the compressor 13 for compressing BOG, the BOG needs to be transferred through an oil filter when the BOG is branched at 4-stage or more of the compressor. However, it is advantageous in that the oil filter need not be used when the BOG is branched at 3-stage or less of the compressor.

The required pressure of the DF engine (for example, DFDG) serving as the sub engine is lower than that of the MEGI engine. Therefore, when the BOG compressed at a high pressure is branched at the rear end of the compressor 13, it is inefficient because the pressure of the BOG needs to be lowered again and then supplied to the sub engine.

As described above, if LNG is heated, methane component having a relatively low liquefaction temperature is preferentially vaporized. Hence, since a methane content of BOG is high, the BOG can be directly supplied as fuel to the DF engine. Therefore, separate apparatuses for adjusting methane number need not be installed in the main BOG supply line and the sub BOG supply line.

Meanwhile, when it is expected that surplus BOG will be generated because an amount of BOG generated from the cargo tank 11 is larger than an amount of fuel necessary for the main engine and the sub engine, the liquefied gas treatment system of the present invention can reliquefy the BOG and return the reliquefied BOG to the cargo tank.

When BOG is generated over the reliquefaction capacity, BOG having been compressed or being compressed stepwise in the compressor 13 can be branched through the BOG branch line L7 and be used in the BOG consuming means. Examples of the BOG consuming means may include a GCU and a gas turbine, each of which can use natural gas having a relatively lower pressure than the MEGI engine as fuel. As illustrated in FIG. 13, the BOG branch line L7 may be branched from the sub BOG supply line L8.

Since the process in which at least a part of BOG compressed in the compressor 13 and then supplied to the high pressure natural gas injection engine through the BOG supply line L1 is treated through the BOG return line L3, that is, reliquefied and returned to the cargo tank 11 is identical to that described with reference to FIG. 2, a detailed description thereof will be omitted.

Although FIG. 13 illustrates the example in which the BOG return line L3 for supplying the compressed BOG to the heat exchanger 21 is branched at the rear end of the compressor 13, the BOG return line L3 may be installed to branch the BOG being compressed stepwise in the compressor 13, like the above-described BOG branch line L7 and the sub BOG supply line L8 serving as the BOG branch line. FIG. 3 illustrates a modification in which 2-stage compressed BOG is branched by two cylinders, and FIG. 4 illustrates a modification in which 3-stage compressed BOG is branched by three cylinders. At this time, the pressure of the BOG branched from the middle stage of the compressor 13 may be about 6 to 10 bara.

In particular, in the case of using a compressor (manufactured by Burckhardt) including five cylinders in which three cylinders of the front stage are operated in an oil-free-lubricated method and two cylinders of the rear stage are operated in an oil-lubricated method, BOG needs to be transferred while passing through an oil filter when BOG is branched at the rear stage or 4-stage or more of the compressor. However, it is advantageous in that the oil filter need not be used when BOG is branched at 3-stage or less of the compressor.

A discharge pump 12 and a high pressure pump 43 are installed in the main LNG supply line L23. The discharge pump 12 is installed inside the cargo tank 11 and configured to discharge LNG to the outside of the cargo tank 11. The high pressure pump 43 is configured to secondarily compress LNG, which is primarily compressed in the discharge pump 12, to a pressure necessary for the MEGI engine. The discharge pump 12 may be installed in each cargo tank 11. Although only one high pressure pump 43 is illustrated in FIG. 4, a plurality of high pumps may be connected in parallel when necessary.

As described above, the pressure of the fuel gas necessary for the MEGI engine is a high pressure of about 150 to 400 bara (absolute pressure). In this specification, it should be considered that the term "high pressure" as used herein refers to a pressure necessary for the MEGI engine, for example, a pressure of about 150 to 400 bara (absolute pressure).

The LNG discharged from the cargo tank 11 storing liquefied gas through the discharge pump 12 is transferred along the main LNG supply line L23 and is then supplied to the high pressure pump 43. Then, the LNG is compressed to a high pressure in the high pressure pump 43, is supplied to the vaporizer 44, and is vaporized in the vaporizer 44. The vaporized LNG is supplied as fuel to the high pressure natural gas injection engine, that is, the MEGI engine. Since the pressure necessary for the MEGI engine is in a supercritical state, the LNG compressed to the high pressure is a state that is neither gas nor liquid. Therefore, it should be considered that the expression "vaporizing the LNG compressed to the high pressure in the vaporizer 44" means raising the temperature of the LNG being in the supercritical state up to a temperature necessary for the MEGI engine.

The sub LNG supply line L24 for supply fuel gas to the sub engine (that is, the DF engine) is branched from the main LNG supply line L23. More specifically, the sub LNG supply line L24 is branched from the main LNG supply line L23 such that LNG can be branched before being compressed in the high pressure pump 43.

Meanwhile, in FIG. 13, the sub LNG supply line L24 is illustrated as being branched from the main LNG supply line L23 at the upstream side of the high pressure pump 43. However, according to the modification, the sub LNG supply line L24 may be branched from the main LNG supply line L23 at the downstream side of the high pressure pump 43. However, in the case where the LNG supply line L24 is branched from the downstream side of the high pressure pump 43, since the pressure of the LNG has been raised by the high pressure pump 43, it is necessary to lower the pressure of the LNG to the pressure necessary for the sub engine by the decompressing means before supplying the LNG to the sub engine as fuel. Like the embodiment illustrated in FIG. 13, it is advantageous in that additional decompressing means need not be installed when the sub LNG supply line L24 is branched at the upstream side of the high pressure pump 43.

A vaporizer 45, a gas-liquid separator 46, and a heater 47 are installed in the sub LNG supply line L24 so as to adjust the methane number and temperature of LNG supplied as fuel to the value required in the DF engine.

As described above, since the methane content of the LNG is relatively lower than that of the BOG, the methane number of the LNG is lower than the methane number required in the DF engine. Ratios of hydrocarbon components (methane, ethane, propane, butane, and the like) constituting the LNG are different according to producing areas. Therefore, it is not suitable to vaporize the LNG as it is and then supply the vaporized LNG to the DF engine as fuel.

In order to adjust the methane number, the LNG is heated and partially vaporized in the vaporizer 45 The fuel gas partially vaporized to a state in which the gas state (that is, natural gas) and the liquid state (that is, LNG) are mixed is supplied to the gas-liquid separator 46 and is separated into gas and liquid. Since the vaporization temperature of heavy hydrocarbon (HHC) component having a high calorific value is relatively high, a ratio of the HHC component is relatively increased in the LNG of the liquid state that remains without being vaporized in the partially vaporized BOG. Therefore, the methane number of the fuel gas can be increased by separating the liquid component in the gas-liquid separator 46, that is, by separating the HHC component.

In order to obtain appropriate methane number, the heating temperature in the vaporizer 45 can be adjusted considering the ratio of the hydrocarbon component included in the LNG, the methane number required in the engine, and the like. The heating temperature in the vaporizer 45 may be determined in the range of −80° C. to −120° C. The liquid component separated from the fuel gas in the gas-liquid separator 46 is returned to the cargo tank 11 through the liquid-component return line L5. The BOG return line L3 and the liquid-component return line L5 may extend to the cargo tank 11 after joining each other.

The fuel gas, the methane number of which is adjusted, is supplied to the heater 47 through the sub LNG supply line L24, is further heated to a temperature required in the sub engine, and is then supplied as fuel to the sub engine. For example, when the sub engine is the DFDG, the required methane number is generally 80 or more. For example, in the case of general LNG (typically, methane: 89.6%, nitrogen: 0.6%), the methane number before separating the HHC component is 71.3, and a lower heating value (LHV) at that time is 48, 872.8 kJ/kg (at 1 atm, saturated vapor). When the HHC component is removed by compressing the general LNG to 7 bara and heating it to −120° C., the methane number is increased to 95.5 and the LHV at that time is 49, 265.6 kJ/kg.

According to the present embodiment, there are two passages through which the fuel gas is supplied to the engines (the main engine and the sub engine). That is, the fuel gas may be supplied to the engines after being compressed through the compressor 13, or may be supplied to the engines after being compressed through the high pressure pump 43.

In particular, a vessel, such as LNG carrier or LNG RV, is used to transport LNG from a producing area to a consumer. Therefore, when sailing to the producing area, the vessel sails in a laden condition in which the LNG is fully loaded into the cargo tank. When returning to the producing area after unloading the LNG, the vessel sails in a ballast condition in which the cargo tank is almost empty. In the laden condition, a large amount of BOG is generated because an amount of LNG is relatively large. In the ballast condition, a relatively small amount of BOG is generated because an amount of LNG is small.

Although there is a difference according to the capacity of the cargo tank, outside temperature, and the like, an amount of BOG generated when the capacity of the LNG cargo tank is about 130,000 to 350,000 is 3 to 4 ton/h in the laden condition and is 0.3 to 0.4 ton/h in the ballast condition. In addition, an amount of fuel gas necessary for the engines is about 1 to 4 ton/h (about 1.5 ton/h on average) in the case of the MEGI engine and is about 0.5 ton/h in the case of the DF engine (DFDG). Meanwhile, in recent years, since a boil-off rate (BOR) has tended to be lowered due to the improvement in the heat insulation performance of the cargo tank, a generation amount of BOG has tended to be reduced.

Therefore, in the case where both the compressor line (that is, L1 and L8 in FIG. 13) and the high pressure pump line (that is, L23 and L24 in FIG. 13) are provided like the fuel gas supply system of the present embodiment, it is preferable that the fuel gas is supplied to the engines through the compressor line in the laden condition in which a large amount of BOG is generated, and the fuel gas is supplied to the engines through the high pressure pump lines in the ballast condition in which a small amount of BOG is generated.

Generally, energy necessary for the compressor to compress gas (BOG) up to the high pressure of about 150 to 400 bara (absolute pressure) required in the MEGI engine is considerably more than energy necessary for the pump to compress liquid (LNG). The compressor for compressing the gas to the high pressure is very expensive and occupies a large space. Therefore, it can be considered that the use of the high pump line alone without any compression line is cost-effective. For example, 2-MW power is consumed for supplying fuel to the MEGI engine by driving one set of the compressor configured with the multi-stage. However, if the high pressure pump is used, 100-kW power is consumed. However, when the fuel gas is supplied to the engines by using the high pressure pump line alone in the laden condition, a reliquefaction apparatus for reliquefying BOG is necessarily required so as to treat BOG continuously generated in the cargo tank. When considering energy consumed in the reliquefaction apparatus, it is advantageous that both the compressor line and the high pressure pump line are installed, the fuel gas is supplied through the compressor line in the laden condition, and the fuel gas is supplied through the high pressure pump line in the ballast condition.

Meanwhile, like the ballast condition, when an amount of BOG generated in the cargo tank is smaller than an amount of fuel necessary for the MEGI engine, it may be efficient to branch BOG through the sub BOG supply line L8 in the process of being multi-stage compressed and use the branched BOG as the fuel of the DF engine, without compressing BOG in the multi-stage compressor to the high pressure required in the MEGI. That is, for example, if BOG is supplied to the DF engine through only the 2-stage compression cylinders of the 5-stage compressor, the remaining 3-stage compression cylinders run idle. 2-MW power is required when BOG is compressed by driving the entire 5-stage compressor. 600-kW power is required when the 2-stage compression cylinders are used and the remaining 3-stage compression cylinders run idle. 100-kW power is required when the fuel is supplied to the MEGI engine through the high pressure pump. Therefore, like the ballast condition, when a generation amount of BOG is smaller than an amount of fuel necessary for the MEGI engine, it is advantageous in terms of energy efficiency to consume all amount of BOG in the DF engine or the like and supply LNG as fuel through the high pressure pump.

However, if necessary, even when a generation amount of BOG is smaller than an amount of fuel necessary for the MEGI engine, LNG may be forcibly vaporized and supplied as much as a deficient amount while supplying BOG as fuel to the MEGI engine through the compressor. Meanwhile, since a generation amount of BOG is small in the ballast condition, BOG is not discharged but accumulated until the cargo tank reaches a predetermined pressure, and is intermittently discharged and supplied as fuel to the DF engine or the MEGI engine, instead of discharging and consuming BOG whenever the BOG is generated.

In the ballast condition, the engine of the vessel (the DF engine or the MEGI engine) may be simultaneously supplied with BOG compressed by the compressor 13 and LNG compressed by the high pressure pump 43 as fuel. In addition, in the ballast condition, the engine of the vessel (the DF engine or the MEGI engine) may be alternately supplied with BOG compressed by the compressor 13 and LNG compressed by the high pressure pump 43 as fuel.

In the case of a low-pressure engine, such as a boiler, a gas turbine, or a low-pressure DF engine, which is supplied with a low-pressure fuel in use, a fuel supply system has been developed which uses BOG generated in the storage tank as fuel in a normal condition, and forcibly vaporizes LNG and uses the vaporized LNG as fuel together with the BOG when an amount of BOG is smaller than a necessary amount of fuel. Such a fuel supply system is limited to a case where only a low-pressure engine is installed in a vessel. The naturally generated BOG and the forcibly vaporized LNG are different in the heating value and the methane number.

Thus, in a case where the BOG and the forcibly vaporized LNG is supplied to one engine in a mixed manner, the engine power is changed as the component of the fuel, that is, the heating value, is continuously changed. This makes it difficult to operate the engine. In the case of a cargo ship such as an LNG carrier, a relatively sufficient amount of BOG is generated in a laden condition in which the cargo ship is fully loaded with cargo on voyage. However, in a ballast condition in which the cargo ship is returned after unloading the cargo, an amount of BOG is deficient and thus it is necessary to forcibly vaporize the LNG. Therefore, in the ballast condition corresponding to about half the total sailing period, the problems such as a change in the engine power continually occur.

However, the above-described embodiments of the present invention significantly differ from the fuel supply system mounted with only the low-pressure engine, in that both of the high-pressure engine supplied with the fuel at a high pressure (for example, MEGI engine, about 150 to 400 bara) and the low-pressure engine supplied with the fuel at a low pressure (for example, DF engine, about 6-10 bara) are mounted.

In addition, according to the present invention, when the generation amount of BOG is smaller than the amount of fuel required in the entire engine, the BOG is supplied as the fuel to only the low-pressure engine, or the LNG is supplied as the fuel to both the high-pressure engine and the low-pressure engine. When a predetermined amount of BOG is accumulated in the storage tank, the BOG and the LNG are alternately supplied as the fuel to the engines. Therefore, it is possible to solve the problem occurring when the BOG and the forcibly vaporized LNG are supplied to one engine in a mixed manner.

However, according to the embodiments of the present invention, it is obvious that the BOG compressed by the compressor 13 and the LNG compressed by the high pressure pump 43 can be simultaneously supplied as the fuel to one engine as necessary.

In addition, in the vessels where it is not easy to repair and replace equipments, important facilities are required to be installed by two in consideration of emergency (redundancy). That is, the redundancy of important facilities is required such that extra facilities capable of performing the same function as the main facility, and the extra equipment is set to a standby state during the normal operation of the main facility and takes over the function of the main facility when the main facility does not operate due to malfunction. Examples of the facilities requiring the redundancy may include rotating facilities, for example, compressors or pumps.

As such, various facilities need to be redundantly installed in the vessel so as to satisfy only the redundancy requirement while not being used at regular days. The fuel gas supply system using two compression lines requires much cost and space for the installation of the compressor. When using the fuel gas supply system, much energy is consumed. The fuel gas supply system using two high pressure pump lines may consume much energy in the treatment (reliquefaction) of BOG. On the other hand, in the fuel gas supply system of the present invention in which both the compressor line and the high pressure pump line are installed, even when there occurs a problem in one of the supply lines, the vessel can continue to sail normally through another supply line. In the case where only one compression line is installed, expensive compressors are less used and an optimal fuel gas supply method can be appropriately selected and used according to a generation amount of BOG. Therefore, it is possible to obtain additional effect that can save operation cost as well as initial shipbuilding cost.

As illustrated in FIG. 13, when the liquefied gas treatment system and the hybrid fuel gas supply system are combined according to the embodiment of the present invention, BOG generated during the transportation of cargo (that is, LNG) in the LNG carrier may be used as the fuel of the engine, or may be reliquefied, be returned to the cargo tank and be stored therein. Therefore, an amount of BOG consumed in the GCU or the like can be reduced or removed. Furthermore, BOG can be treated by reliquefaction, without installing reliquefaction apparatuses using separate refrigerants such as nitrogen.

According to the present embodiment, in spite of the recent trend in which the generation amount of BOG is increased due to the increased capacity of the cargo tank and a necessary amount of fuel is reduced due to the improved performance of the engine, the BOG remaining after being used as the fuel of the engine can be reliquefied and returned to the cargo tank, thereby preventing the waste of BOG In particular, in the liquefied gas treatment system and method according to the present embodiment, since it is unnecessary to install the reliquefaction apparatuses using separate refrigerants (that is, nitrogen-refrigerant refrigeration cycle, mixed-refrigerant refrigeration cycle, or the like), facilities for supplying and storing the refrigerants need not be separately installed. Consequently, it is possible to save initial installation cost and operation cost for configuring the entire system.

While the embodiments of the present invention have been described with reference to the specific embodiments, it will be apparent to those skilled in the art that various changes and modifications may be made without departing from the spirit and scope of the invention as defined in the following claims.

What is claimed is:

1. An LNG tank ship comprising:
an LNG tank containing therein an LNG composition in liquid phase and gas phase;
a supercritical fuel injection engine configured to consume supercritical state LNG;
a liquid discharge port located inside the LNG tank at a lower portion thereof and configured to discharge liquid phase LNG from the LNG tank;
a gas discharge port located inside the LNG tank at a higher portion thereof and configured to discharge gas phase LNG from the LNG tank;
a liquid-to-supercritical pathway for processing liquid phase LNG from the liquid discharge port to generate supercritical state LNG for supplying to the supercritical fuel injection engine, the liquid-to-supercritical pathway comprising a pump and a heater downstream of the pump;
a BOG processing system configured to process the gas phase LNG from the LNG tank and comprising a gas-to-supercritical pathway and a supercritical-to-liquid pathway;
the gas-to-supercritical pathway for processing gas phase LNG from the gas discharge port to generate supercritical state LNG for supplying to the supercritical fuel injection engine, the gas-to-supercritical pathway comprising a gas phase LNG transfer line for receiving gas phase LNG from the gas discharge port, a heat exchanger downstream of the gas phase LNG transfer line, and a multi-stage compressor downstream of the heat exchanger;

the supercritical-to-liquid pathway for processing supercritical state LNG to generate liquid phase LNG for returning to the LNG tank, the supercritical-to-liquid pathway comprising a supercritical state LNG transfer line for receiving supercritical state LNG from the gas-to-supercritical pathway, the heat exchanger downstream of the supercritical state LNG transfer line, a decompressor downstream of the heat exchanger and a LNG return line downstream of the decompressor;
wherein the BOG processing system does not comprise a refrigeration cycle of a non-LNG coolant that liquefies gas phase LNG being processed in the BOG processing system;
wherein, in the liquid-to-supercritical pathway, the pump is configured to pressurize liquid phase LNG from the LNG tank to a pressure of 150-400 bara;
wherein, in the liquid-to-supercritical pathway, the heater is configured to heat the pressurized liquid phase LNG for generating supercritical state LNG, wherein the heater is in fluid communication with the supercritical fuel injection engine for supplying at least part of the supercritical state LNG to the supercritical fuel injection engine;
wherein the heat exchanger is configured to heat exchange between the gas phase LNG of the gas-to-supercritical pathway and the supercritical state LNG of the supercritical-to-liquid pathway such that the gas phase LNG of the gas-to-supercritical pathway is heated while the supercritical state LNG of the supercritical-to-liquid pathway is cooled without heat-exchange with a non-LNG coolant of a refrigeration cycle;
wherein, in the gas-to-supercritical pathway, the multi-stage compressor comprises a plurality of serially connected compressors configured to pressurize the heated gas phase LNG for generating supercritical state LNG having a pressure of 150-400 bara, wherein the multi-stage compressor is in fluid communication with the supercritical fuel injection engine for supplying at least part of the supercritical state LNG from the multi-stage compressor to the supercritical fuel injection engine;
wherein, in the supercritical-to-liquid pathway, the decompressor is configured to depressurize the cooled LNG from the heat exchanger; and
wherein, in the supercritical-to-liquid pathway, the LNG return line is in fluid communication with the LNG tank for returning depressurized liquid phase LNG to the LNG tank.

2. The ship of claim 1, further comprising:
a valve system configured to control connection of the liquid-to-supercritical pathway to the liquid discharge port, connection of the gas-to-supercritical pathway to the gas discharge port, and connection of the supercritical-to-liquid pathway to the gas-to-supercritical pathway for selective operation of one or more of the liquid-to-supercritical pathway, the gas-to-supercritical pathway, and the supercritical-to-liquid pathway such that:
the multi-stage compressor of the gas-to-supercritical pathway is not to operate for generating supercritical state LNG while the liquid-to-supercritical pathway is operating to generate supercritical state LNG, and
the supercritical-to-liquid pathway is to operate only when the gas-to-supercritical pathway is operating to generate supercritical state LNG.

3. The ship of claim 1, further comprising a gas fuel combustion device configured to consume gas phase LNG, wherein the multi-stage compressor is configured such that only part of the plurality of serially connected compressors is to operate for not generating supercritical state LNG and for generating pressurized gas phase LNG to supply to the gas fuel combustion device.

4. The ship of claim 3, wherein the LNG tank ship is configured such that while the liquid-to-supercritical pathway is operating to generate supercritical state LNG, the multi-stage compressor of the gas-to-supercritical pathway is not to operate for generating supercritical state LNG but is to operate for generating pressurized gas phase LNG.

5. The ship of claim 3, wherein the gas fuel combustion device comprises an engine configured to run on gas phase LNG, wherein the supercritical fuel injection engine comprises an MEGI engine.

6. The ship of claim 1, wherein the decompressor is configured to provide a liquid-gas mixture of LNG, wherein the LNG return line is configured to return the liquid-gas mixture to the LNG tank.

7. The ship of claim 1, wherein the decompressor is configured to provide a liquid-gas mixture of LNG, wherein the supercritical-to-liquid pathway further comprises a liquid-gas separator downstream of the decompressor and upstream of the LNG return line, wherein the liquid-gas separator is configured to separate liquid phase LNG from the liquid-gas mixture and to supply the separated liquid phase LNG to the LNG return line for returning to the LNG tank.

8. The ship of claim 2, wherein the valve system is configured to control connection of the gas-to-supercritical pathway to the gas discharge port to selectively operate the gas-to-supercritical pathway based on a rate of boil-off gas generation within the LNG tank and further based on a rate of a total amount of LNG combustion in the ship.

9. The ship of claim 2, wherein the valve system is configured to control connection of the gas-to-supercritical pathway to the gas discharge port to selectively operate the gas-to-supercritical pathway when the rate of boil-off gas generation within the LNG tank is smaller than the rate of the total LNG combustion in the ship.

10. The ship of claim 2, wherein the valve system is configured to control connection of the gas-to-supercritical pathway to the gas discharge port to operate the gas-to-supercritical pathway only during a laden voyage, wherein the valve system is configured to control connection of the supercritical-to-liquid pathway to the gas-to-supercritical pathway to operate the supercritical-to-liquid pathway only during a laden voyage.

11. The ship of claim 2, wherein the valve system is configured to control valve connections such that the gas-to-supercritical pathway and the supercritical-to-liquid pathway are not to operate during a ballistic voyage whereas the liquid-to-supercritical pathway is not to operate during a laden voyage.

12. The ship of claim 1, further comprising:
a gas fuel combustion device configured to consume gas phase LNG;
a liquid-to-gas pathway for processing liquid phase LNG from the liquid discharge port to generate gas phase LNG for supplying to the gas fuel combustion device, the liquid-to-gas pathway comprising a vaporizer, a gas-liquid separator downstream of the vaporizer and a heater downstream of the gas-liquid separator;
the vaporizer configured to vaporize liquid phase LNG from the liquid discharge port for providing a gas-liquid mixture;
the gas-liquid separator configured to separate gas phase LNG from the gas-liquid mixture from the vaporizer; and
the heater configured to heat gas phase LNG separated from the gas-liquid separator to raise its temperature, wherein the heater is in fluid communication with the gas fuel combustion device for supplying thereto the heated gas phase LNG.

13. The ship of claim 12, wherein the liquid-to-gas pathway is not to operate when a rate of boil-off gas generation within the LNG tank exceeds a rate of a total amount of LNG combustion in the ship.

14. The ship of claim 12, wherein the liquid-to-gas pathway is to operate only during a ballistic voyage.

15. The ship of claim 1, wherein the LNG tank ship comprises only one unit of the multi-stage compressor for the gas-to-supercritical pathway and does not comprise a backup multi-stage compressor for the gas-to-supercritical pathway.

16. A method of processing LNG in the ship of claim 1, the method comprising:
monitoring liquid phase LNG and gas phase LNG in the LNG tank;
running the liquid-to-supercritical pathway, which comprises discharging liquid phase LNG from the LNG tank, pumping the liquid phase LNG to a pressure of 150-400 bara, subsequently heating the pumped liquid phase LNG to its supercritical state in its pressure of 150-400 bara, and supplying at least part of the supercritical state LNG to the supercritical fuel injection engine;
running the gas-to-supercritical pathway, which comprises discharging gas phase LNG from the LNG tank, heating the gas phase LNG, subsequently pressurizing the heated gas phase LNG to generate supercritical state LNG having a pressure of 150-400 bara, and supplying at least part of the supercritical state LNG to the supercritical fuel injection engine;
running the supercritical-to-liquid pathway, which comprises cooling supercritical state LNG, subsequently depressurizing the cooled LNG, and returning at least part of depressurized liquid phase LNG to the LNG tank;
wherein heating of the gas phase LNG in the gas-to-supercritical pathway and cooling of the supercritical state LNG in the supercritical-to-liquid pathway are performed in a heat exchanger that heat exchanges between the gas phase LNG of the gas-to-supercritical pathway and the supercritical state LNG of the supercritical-to-liquid pathway such that the gas phase LNG of the gas-to-supercritical pathway is heated while the supercritical state LNG of the supercritical-to-liquid pathway is cooled;
controlling valves connecting the liquid-to-supercritical pathway to the liquid discharge port, the gas-to-supercritical pathway to the gas discharge port, and the supercritical-to-liquid pathway to the gas-to-supercritical pathway for selective operation of one or more of the liquid-to-supercritical pathway, the gas-to-supercritical pathway, the supercritical-to-liquid pathway such that
the gas-to-supercritical pathway is not run for generating supercritical state LNG while the liquid-to-supercritical pathway is operating to generate supercritical state LNG, and
the supercritical-to-liquid pathway is run only when the gas-to-supercritical pathway is running to generate supercritical state LNG.

* * * * *